United States Patent [19]
Lowe, Jr.

[11] Patent Number: 6,016,991
[45] Date of Patent: Jan. 25, 2000

[54] EVACUATED ROTATING ENVELOPE AIRCRAFT

[76] Inventor: Charles S. Lowe, Jr., 2240 Berks Rd., Lansdale, Pa. 19446

[21] Appl. No.: 08/788,535

[22] Filed: Jan. 24, 1997

[51] Int. Cl.[7] ....................................................... B64B 1/02
[52] U.S. Cl. ......................... 244/5; 244/12.2; 244/23 C; 244/29; 244/97
[58] Field of Search ........................... 244/5, 12.2, 23 C, 244/24, 29, 30, 97, 125, 128

[56] References Cited

U.S. PATENT DOCUMENTS

| | | | |
|---|---|---|---|
| 205,319 | 6/1878 | Tracy | 244/125 |
| 998,538 | 7/1911 | Lehmann | 244/97 |
| 1,119,710 | 3/1914 | Maurer . | |
| 1,390,745 | 9/1921 | Armstrong . | |
| 3,053,483 | 9/1962 | Stahmer . | |
| 3,199,809 | 8/1965 | Modesti | 244/12.2 |
| 3,420,473 | 1/1969 | Krafft | 244/30 |
| 3,537,669 | 11/1970 | Modesti | 244/23 C |
| 4,032,086 | 6/1977 | Cooke | 244/30 |
| 4,113,206 | 9/1978 | Wheeler | 244/125 X |
| 4,269,375 | 5/1981 | Hickey | 244/30 X |
| 4,366,936 | 1/1983 | Ferguson | 244/30 X |
| 4,452,410 | 6/1984 | Everett | 244/23 C X |
| 4,534,525 | 8/1985 | Bliamptis | 244/30 |
| 4,606,515 | 8/1986 | Hickey | 244/23 C |
| 4,711,416 | 12/1987 | Regipa | 244/30 X |
| 5,351,911 | 10/1994 | Neumayr | 244/23 C |
| 5,810,286 | 9/1988 | Matsler | 244/29 |

*Primary Examiner*—Charles T. Jordan
*Assistant Examiner*—Christopher K. Montgomery
*Attorney, Agent, or Firm*—Michael F. Petock

[57] ABSTRACT

An aircraft utilizes a buoyant evacuated rotating envelope to provide at least a portion of the lift required. The rotating envelope may be in the form of a disk, cylinder or other suitable shape. In one embodiment, an evacuated rotating envelope in the form of a disk is utilized. The disk is provided with a central core tube with at least one jet engine mounted therein. The deflection of the exhaust causes rotation of the envelope. A non-rotating payload compartment is mounted to the rotating envelope by bearings. Structures are provided for deflecting the exhaust to be utilized for lateral propulsion as well as for stabilizing the payload compartment to prevent rotation. Two other embodiments utilize rotating cylinders which may be rotated either by a jet engine mounted within a core tube or by an off center jet engine which drives the cylinder. In all of the embodiments, the envelope is evacuated by pumps and the centrifugal force of rotation reduces the amount of necessary mechanical structure to maintain the envelope shape. Accordingly, an evacuated envelope may be utilized with a minimum of weight required to maintain its structural rigidity.

46 Claims, 15 Drawing Sheets

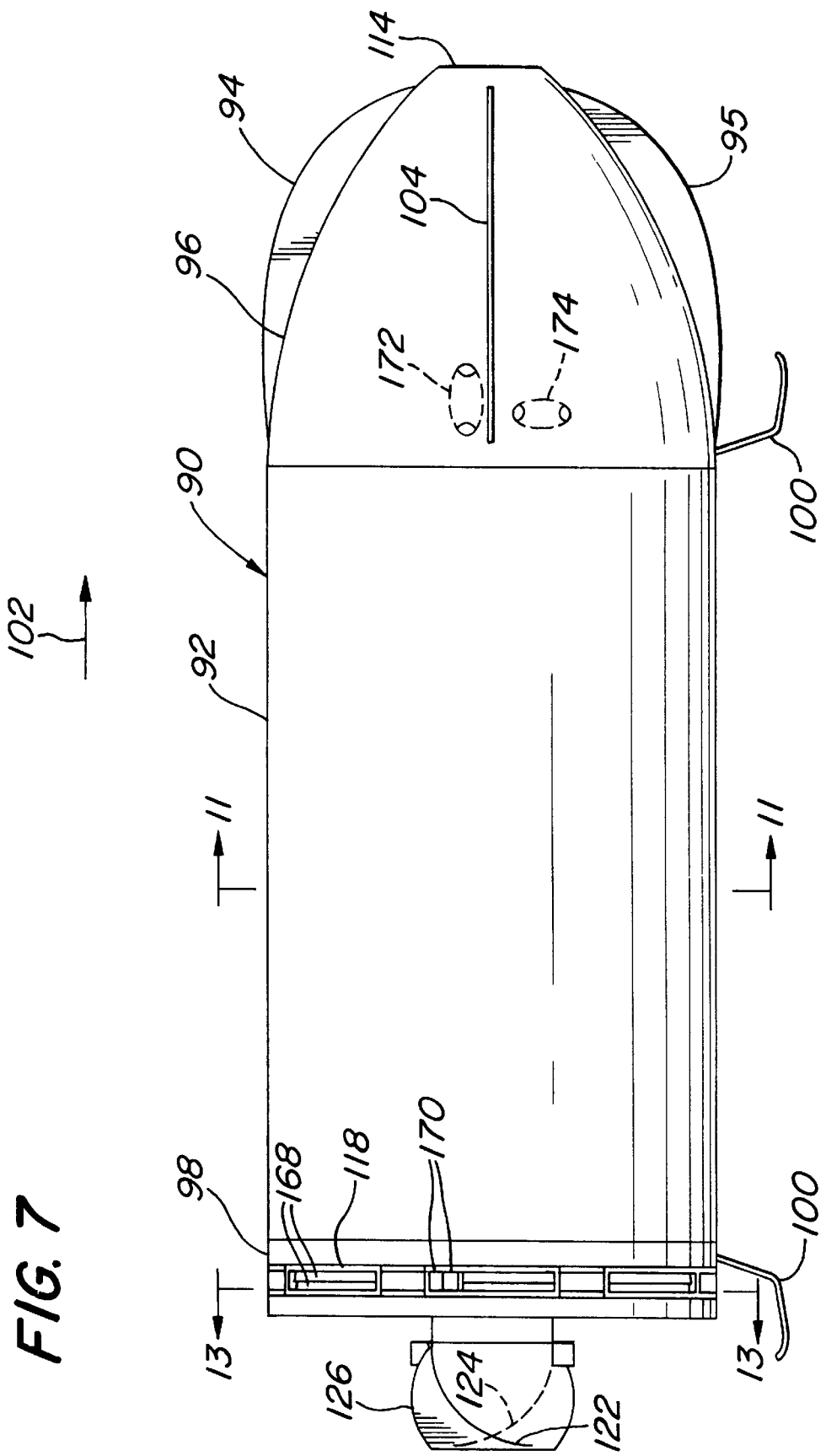

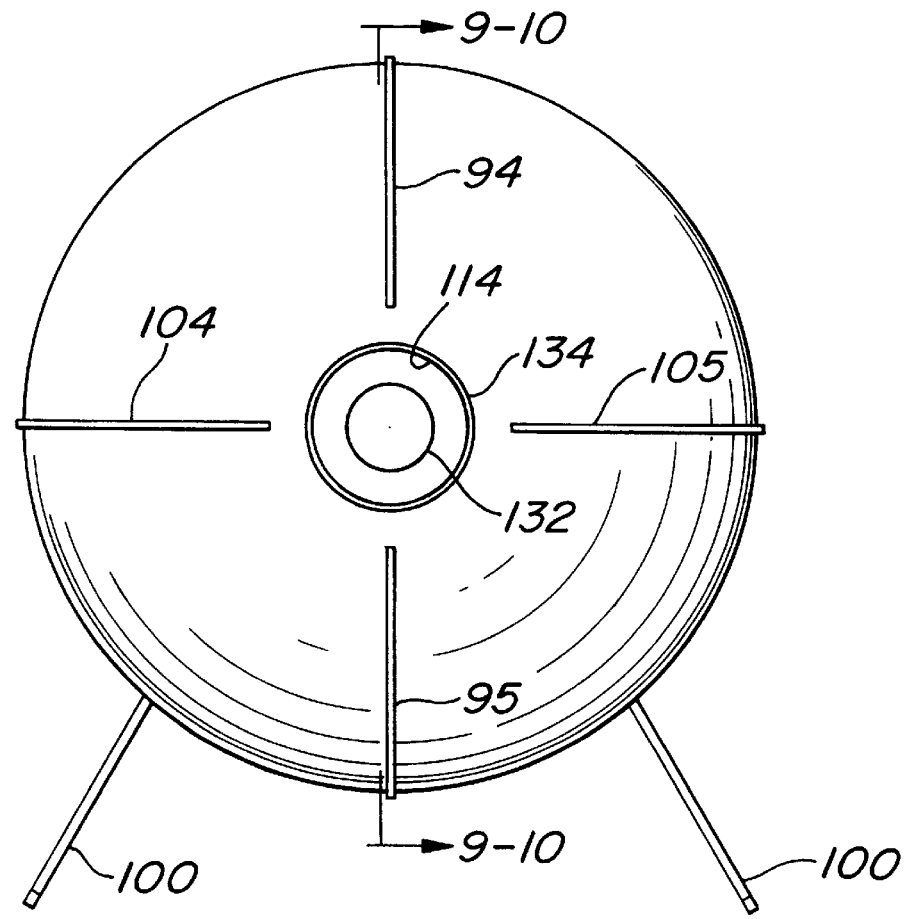
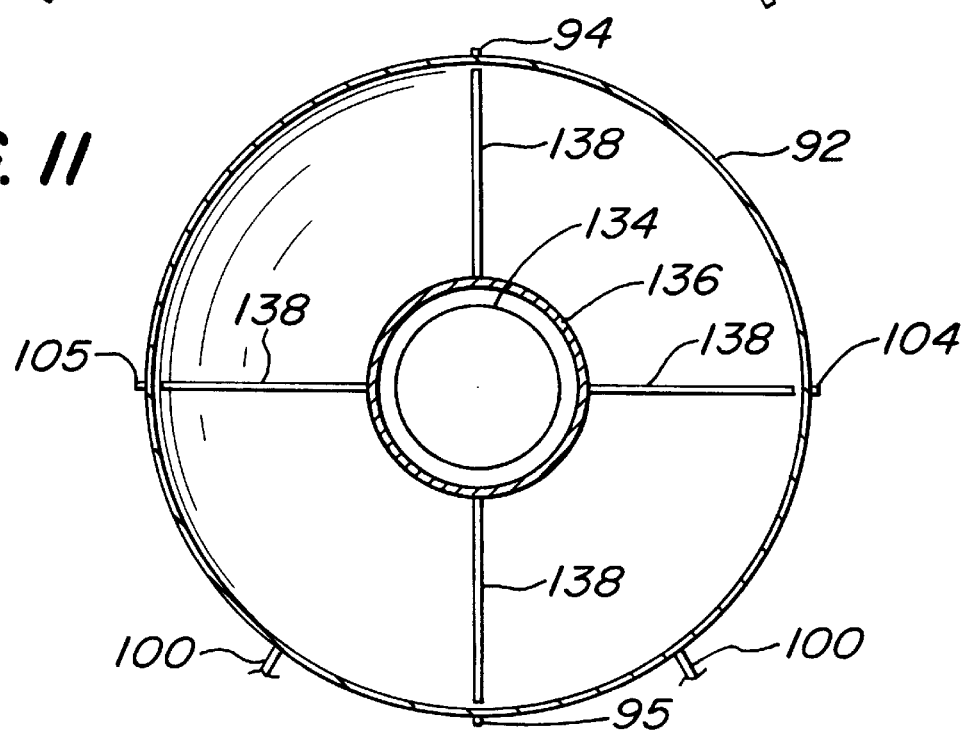

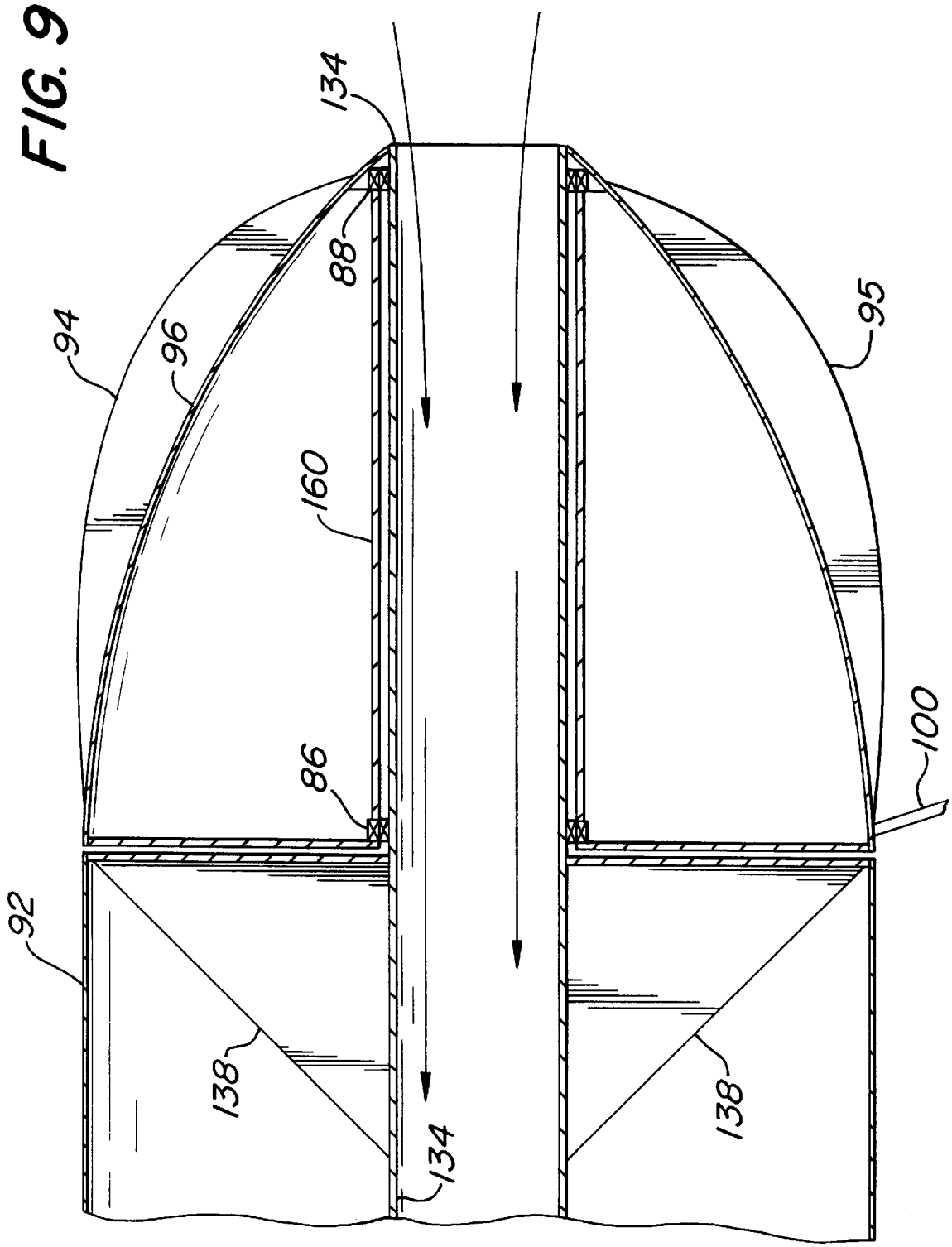

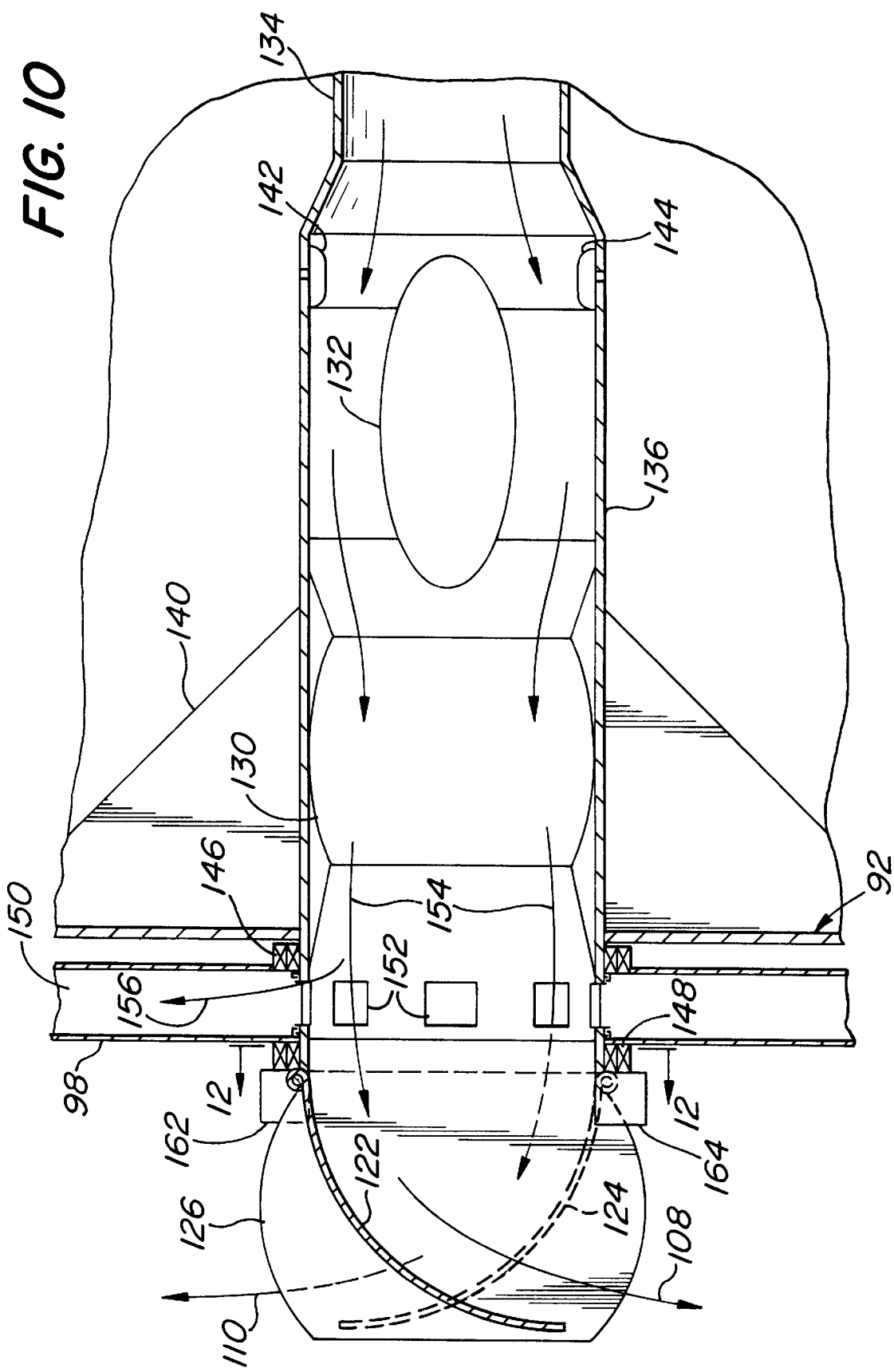

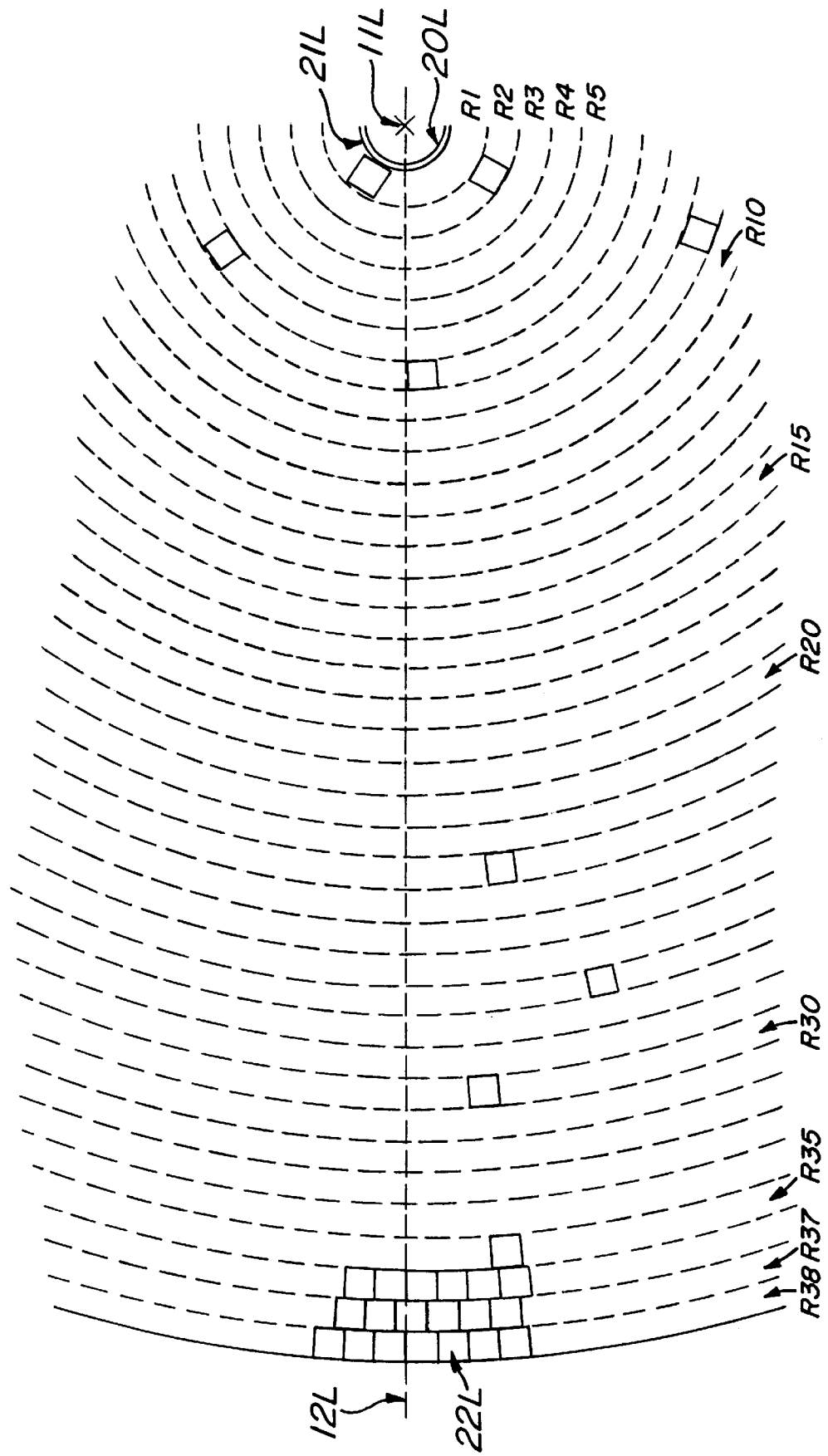

EVACUATED ROTATING ENVELOPE AIRCRAFT

FIELD OF THE INVENTION

The present invention relates to a new and unobvious type of aircraft and methods associated with enabling aircraft flight. More particularly, the present invention is directed to a new and unobvious aircraft which utilizes in flight a partially evacuated rotating envelope to produce buoyancy wherein the centrifugal force of rotation acting on the envelope increases the structural rigidity enabling the use of lighter structural materials for the envelope.

BACKGROUND OF THE INVENTION

Man has been able to cause powered aircraft to fly through the atmosphere since the early part of the Twentieth Century. Much work has been done and continues to be done in developing improved and more versatile aircraft.

The most commonly used type of aircraft today requires enormous landing strips for take off and landing. However, over the years, much work has been done in attempting to develop suitable and improved vertical take off and landing (VTOL) aircraft. These have included helicopters as well as dirigibles, balloons and blimps.

Lighter-than-air aircraft such as dirigibles and the like which utilize helium or other lighter-than-air gases have the disadvantage of not only the cost of the lighter-than-air gas, the need to increase and decrease the volume of helium for ascent and descent, the substantial structure, including its weight, for containing the lighter-than-air gas and the very large structure sizes required to house gases which are only somewhat lighter than air.

Helicopters are a much heavier-than-air aircraft requiring rotating propeller or airfoil structures. Some attempt has also been made for providing vertical take off either by the means of propellers or rockets, sometimes mounted on wings which may be directed vertically for take off and horizontally for flight.

However, none of these prior art devices nor any combination of them teaches or suggests a new class of aircraft as disclosed and claimed herein.

SUMMARY OF THE INVENTION

The present invention creates a new category of aircraft or air transport vehicle. The present invention further includes new methods of achieving vertical take off and landing and flight in an economical, efficient and effective manner.

The present invention provides numerous advantages. An advantage of the present invention is that it provides an aircraft with vertical take off and landing (VTOL) capabilities thereby eliminating the need for enormous take off and landing runways. The VTOL capabilities of the present invention significantly reduce infrastructure requirements at ground-based air terminal facilities with consequent and substantial reductions in the environmental and economic impacts of such terminals.

Another advantage of the present invention is that its VTOL capabilities substantially improve the safety attributes of the aircraft as contrasted with most conventional aircraft since emergency landings may be safely conducted at vastly more locations.

Another advantage of the present invention is reduction in likelihood of sudden precipitous descent typically encountered by aircraft such as helicopters on the occurrence of a mechanical failure.

Another advantage of the present invention is that it provides an aircraft which is capable of lighter-than-air flight capabilities without the requirement of a lighter-than-air gas.

Another advantage of the present invention is that it is able to provide such an aircraft, which does not require a lighter-than-air gas, utilizes a vacuum or partial vacuum and is able to be constructed and operated as a light-weight vehicle by utilizing centrifugal force to provide structural rigidity.

Another advantage of the present invention is the ability to provide control in flight in at least certain embodiments utilizing the lift of buoyancy and airfoil characteristics in various combination depending upon the conditions of flight.

Another advantage of the present invention is that it provides an aircraft that is capable of both high speed, long distance, intercontinental operations as well as being a highly maneuverable VTOL aircraft thereby enabling a given volume of airspace to be safely occupied by a substantially larger number of aircraft.

Another advantage of the present invention is that it provides more efficient airspace utilization both at terminal locations as well as in areas between such terminal or airport locations thereby helping to reduce the growing problem of airspace congestion.

Another advantage of the present invention is that it provides an aircraft that is significantly more economical to manufacture and to operate and one that utilizes infrastructure and environmental resources more efficiently.

Another advantage of the present invention is that it provides an aircraft that is significantly more fuel efficient thereby reducing the cost of air transport as well as reducing consequent chemical and noise pollution of the atmosphere.

Briefly and basically, in accordance with the present invention, an aircraft is disclosed wherein lift is provided by means of a buoyant evacuated rotating envelope. The invention also contemplates a method of providing lift by evacuating an envelope wherein rigidity of the evacuated envelope is provided by rotating the envelope to provide centrifugal force or inertial force of rotation on material comprising the envelope. The terms centrifugal force and inertial force of rotation are used herein throughout interchangeably.

Further, in accordance with the present invention, the means for rotating the envelope is attached to the rotating buoyant evacuated envelope and rotates with the envelope. The means for rotating the envelope may be an engine (jet, turbojet, turbofan or even turboprop), which provides sufficient force to rotate the envelope against the force of air friction acting upon the external surface of the envelope.

Further, in accordance with the present invention, the shape, displacement and aspect ratio of the envelope may be changed dynamically during flight to optimize the envelope for varying flight requirements and conditions.

Further, in accordance with the present invention, means such as exhaust baffles or deflectors are provided for dividing the output air and exhaust of the engines into multiple flow streams with a purpose of creating a rotating torque force on the engines and the attached envelope.

Further, in accordance with the present invention, means such as pumps are provided for evacuating and/or pressurizing the envelope for the purpose of developing the desired amount of buoyancy and for maintaining the walls of the envelope under tension under various conditions.

Further, in accordance with the present invention, the means for rotating is selected to provide rotation necessary to provide a sufficient centrifugal force on the exterior material of the rotating envelope whereby the need for and weight of mechanical support structures to withstand the inward force of external atmospheric pressure may be reduced and/or minimized.

Further, in accordance with one embodiment of the present invention, the means for rotation of the envelope causes the envelope to rotate about an axis normal to the direction of lateral motion of the aircraft during flight thereby exposing the leading edges and surfaces of the envelope to aerodynamic heating caused by contact with atmosphere during only a portion of each rotation of the envelope. Rotation of the envelope allows the heat to be dissipated as the heated portion of the envelope rotates away from the leading edge during each revolution.

Further, in accordance with the present invention, lift for the aircraft in at least some embodiments may be supplemented by air foil lift (Bernoulli effect principle) due to lateral movement through the atmosphere, in addition to the buoyancy of the evacuated envelope.

Further, in accordance with the present invention, a payload compartment may be provided, mounted to said rotating envelope by bearings whereby the evacuated rotating envelope may be rotated without rotation of the payload compartment.

Further, in accordance with the present invention, the non-rotating payload compartment may be provided with lateral jets for enhancing lateral motion of the aircraft during flight.

Further, other variations will be apparent to those skilled in the art.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 7 is a side elevation view of another embodiment of the present invention, utilizing an evacuated rotating envelope in the form of a cylinder.

FIG. 8 is a front elevation view of the embodiment shown in FIG. 7.

FIG. 9 is a cross-sectional view of the forward portion of the second embodiment taken along 9—9 of FIG. 8.

FIG. 10 is a cross-sectional view of the aft portion of the second embodiment taken along line 10—10 of FIG. 8.

FIG. 11 is a cross-sectional view taken along line 11—11 of FIG. 7.

FIG. 20 is a plan view of a portion of the rotating envelope of the embodiment of FIG. 19 illustrating an approach to analysis of forces on the structure.

DETAILED DESCRIPTION OF THE PREFERRED EMBODIMENTS

Figure 1:
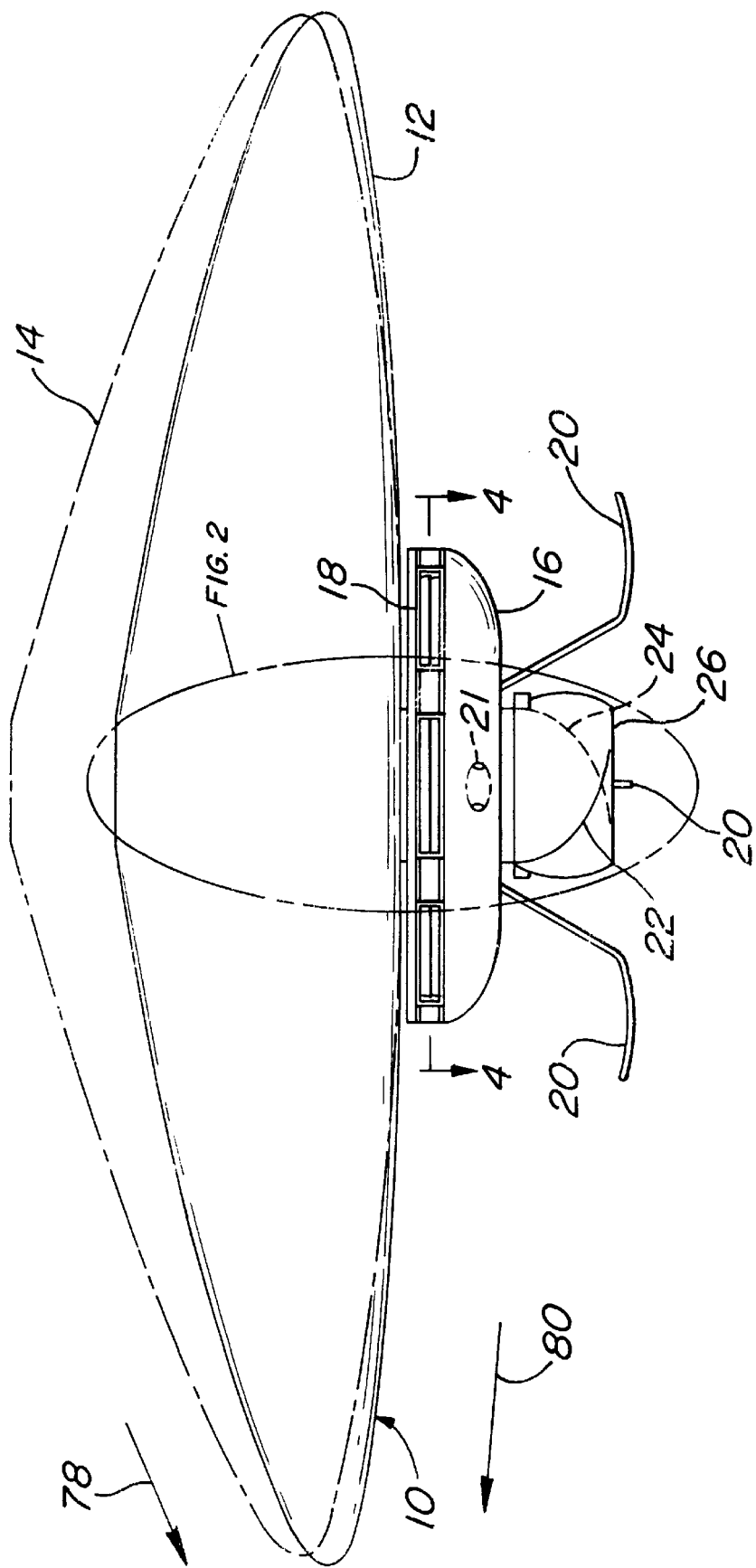
FIG. 1 is an elevation view of the present invention illustrating the rotating envelope in two different configurations, one being illustrated by a dotted line.

Referring now to the drawings in detail wherein like numerals indicate like elements, there is shown in FIG. 1 an aircraft 10 in accordance with the present invention. Aircraft 10 includes an envelope 12 which is adapted to be evacuated and rotated. Envelope 12 may be evacuated to assist in lift off, particularly vertical lift off and may be rotated so that the centrifugal force generated by such rotation applies an outward force to the envelope, thereby enhancing or increasing its structural rigidity and enabling envelope 12 to be constructed with a minimum of structural components and a minimum of weight.

Dotted line 14 shows envelope 12 with a changed and enlarged configuration to enable an increase in buoyancy as may be needed from time to time, particularly during vertical ascent or take off. Envelope 12 may at times contain a positive pressure in excess of ambient surrounding atmospheric pressure, such as for example when the craft is parked on the ground or even during certain conditions of flight where enhanced structural rigidity of the envelope may be desired and the air foil lift provided by envelope 12 is sufficient to maintain the altitude of the aircraft due to the aircraft's high speed of lateral motion.

Still most particularly referring to FIG. 1, there is shown a non-rotating payload compartment 16. Payload compartment 16 may carry people, weapons, goods or any other type of item needed to be transported by air. Although not shown, payload compartment 16 may be provided with windows or viewing ports. Preferably, payload compartment 16 may be equipped with an electronic external viewing system which may be more aero-dynamically effective, efficient and economical. Also shown in FIG. 1 is a plurality of lateral motion jet ports 18. These may be integrally formed as a part of the payload compartment or may be a separate structure above or below the payload compartment. As illustrated in the presently preferred embodiment, the lateral motion jet ports are formed integrally with the payload compartment.

In addition to the lateral motion jet ports, payload compartment 16 may be equipped with one or more engines to provide additional lateral thrust thereby enhancing lateral velocity. One such engine is shown in dotted outline at 21. This may be a jet engine or any other type of suitable engine. Additional such engines may be located around the payload compartment, preferably one being on each side or in each quadrant, but more or less may be utilized as desired. Further, these engines are optional.

Also shown in FIG. 1 is a plurality of light-weight landing gear 20. Preferably, three such landing gear would be utilized, although any other suitable number may be utilized such as 4, 5, 6 or any other suitable number.

Also shown in FIG. 1 are moveable exhaust deflectors 22 and 24 along with an exhaust divider plate 26. Exhaust deflector 24 is shown in dotted line because it is behind exhaust divider plate 26.

Figure 2:
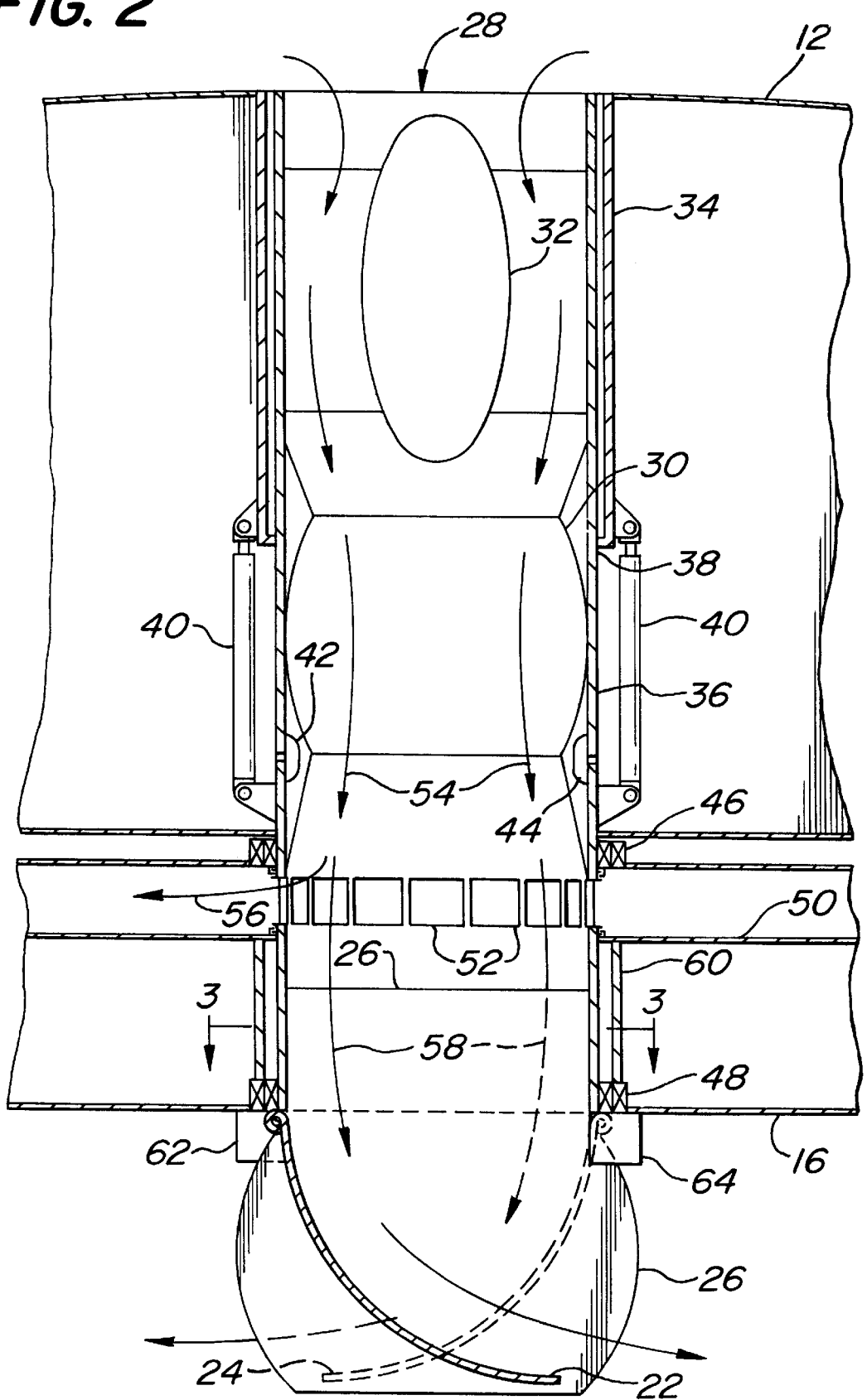
FIG. 2 is a cross-sectional view taken along the dotted section line labelled FIG. 2 of FIG. 1.
Figure 3:
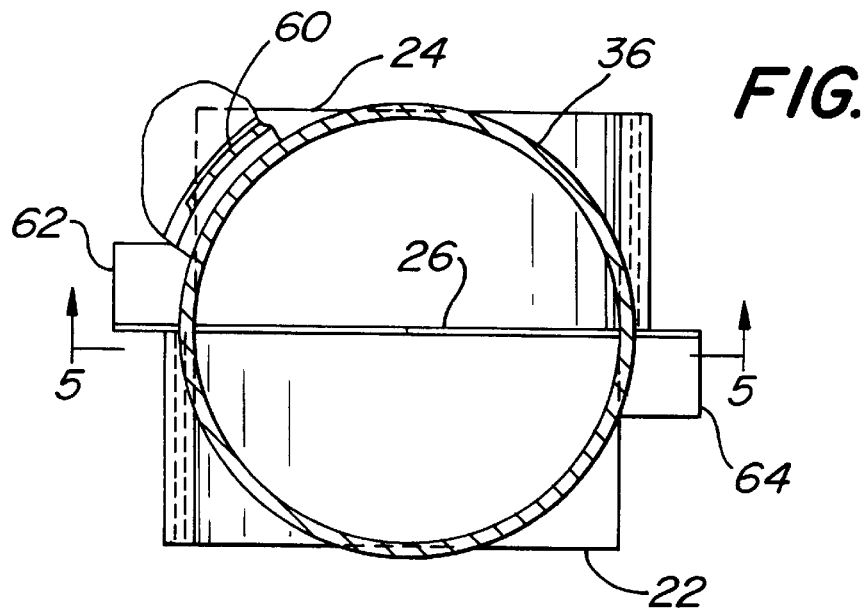
FIG. 3 is a cross-sectional view, partially broken away, taken along line 3—3 of FIG. 2.

Referring now more particularly to FIG. 2, taken in conjunction with FIG. 1, there is shown a cross-sectional view through the center of aircraft 10 showing the central core tube 28, engine 30 and other structure. Engine 30 preferably may be a jet engine, a turbojet or turbofan engine, although any suitable engine such as a propeller engine may be feasible. Central core tube 28 has mounted therein a fuel tank 32 as the central core tube 28 is a convenient and stable location for such mounting. However, it is understood that other suitable locations may be utilized for the fuel tank, including an annular design located within the envelope or other suitable locations. Engine 30 is mounted to and rotates with central core tube 28 and envelope 12, that is they corotate.

Central core tube 28 is preferably constructed of multiple telescoping sections which enables the change of shape and or aspect ratio of envelope 12 as illustrated in FIG. 1. The aspect ratio may be considered to be the ratio of the diameter to the height of the envelope. Envelope 12 is mounted at the upper end to a telescoping enlarged upper core tube section 34. Upper core tube section 34 sealably engages lower core tube section 36 at 38. The movement of upper core tube section 34 on lower core tube section 36 may be controlled by hydraulic cylinders 40 or other suitable mechanical or electrical control means.

Two pumps 42 and 44 are mounted within central core tube 28. Preferably, as illustrated in FIG. 2, these may be mounted within lower core tube section 36 adjacent engine 30, but other suitable mounting locations may be utilized. Pump 42 is an envelope vacuum pump which is used to pump air out of envelope 12 to create a vacuum or a partial vacuum within envelope 12. Envelope pressure pump 44 is used to pump air into envelope 12. These two pumps are managed to ensure that the light-weight low structural component envelope 12 is always under tension and is not in a condition where it may be collapsed by the pressure of the ambient atmosphere regardless of whether envelope 12 is rotating and regardless of any aerodynamic pressure which may be exerted on envelope 12 for any reason, including as a result of its lateral motion relative to ambient atmosphere.

Continuing to refer to FIG. 2, while simultaneously also referencing FIGS. 3 through 6, as well as FIG. 1, non-rotating payload compartment 16 is shown to be mounted on upper bearings 46 and lower bearings 48. Payload compartment 16 may be provided with a wall 60 separating payload compartment 16 from central core tube 28. The upper portion of payload compartment 46 may be provided with an air plenum 50 integrally formed as a part of non-rotating payload compartment 16, or this plenum may be an independent non-rotating structure. However, in a presently preferred embodiment, air plenum 50 would integrally form a part of non-rotating payload compartment 16.

Central core tube 28 is provided with a plurality of openings 52 which enable exhaust gases from engine 30, as shown by arrows 54, to exit into air plenum 50 as shown by arrow 56 as well as to continue directly downward through central core tube 28 as shown by arrows 58.

The downwardly directed exhaust gases as shown by arrows 58 are divided by an exhaust divider plate 26. Exhaust divider plate 26 divides the exhaust into two equal streams such that each stream may be deflected in a different direction from the other by means of movable exhaust deflectors 22 and 24. When movable exhaust deflectors 22 and 24 are positioned as shown in FIGS. 1 and 2, central core tube 28 along with envelope 12, as well as attached engine 30 and fuel tank 32, are caused to rotate. The exhaust gases deflected in this manner may cause high speed rotation. Further, the amount of the deflection and the degree of rotation may be controlled both by the exhaust gas flow rate and the angle of deflectors 22 and 24. Further, the opening of the exhaust deflectors in a manner similar to that shown in FIG. 6 allows the exhaust gases shown by arrows 58 to provide a substantial amount of vertical lift by the jet action of the exhaust gases' downward thrust, especially when the deflectors are open. The position of exhaust deflectors 22 and 24 may be controlled by suitable control means 62 and 64, which may be any suitable type of control means including gears driven by an electric motor, pneumatic, hydraulic or any other suitable controllable drive means.

Figure 5:
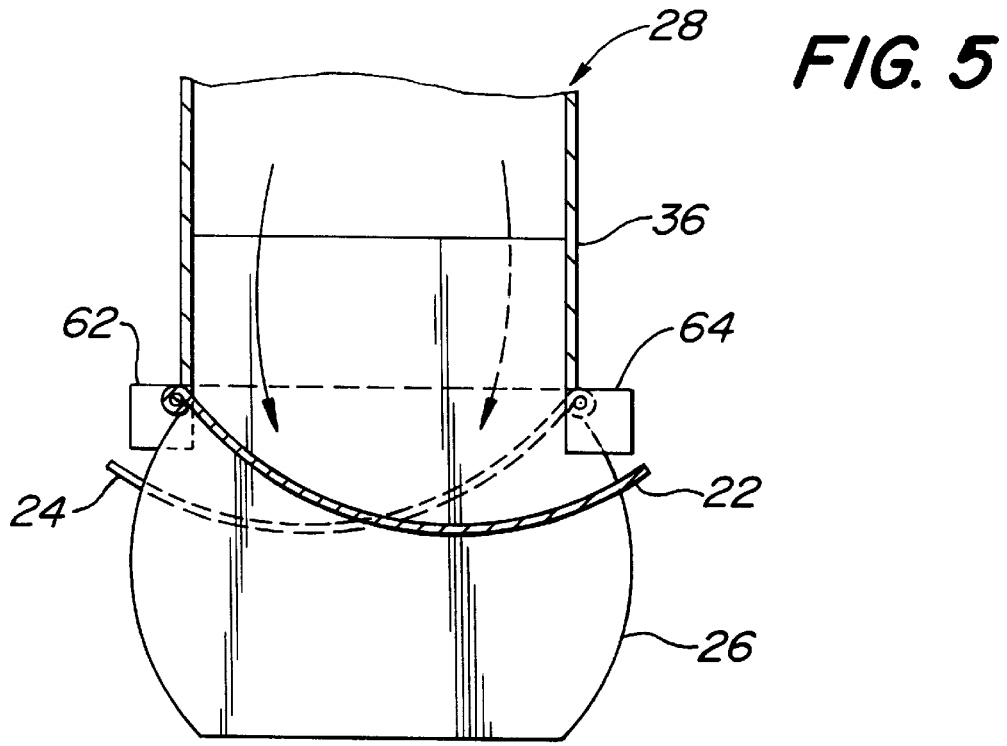
FIG. 5 is a cross-sectional view taken along line 5—5 of FIG. 3.
Figure 6:
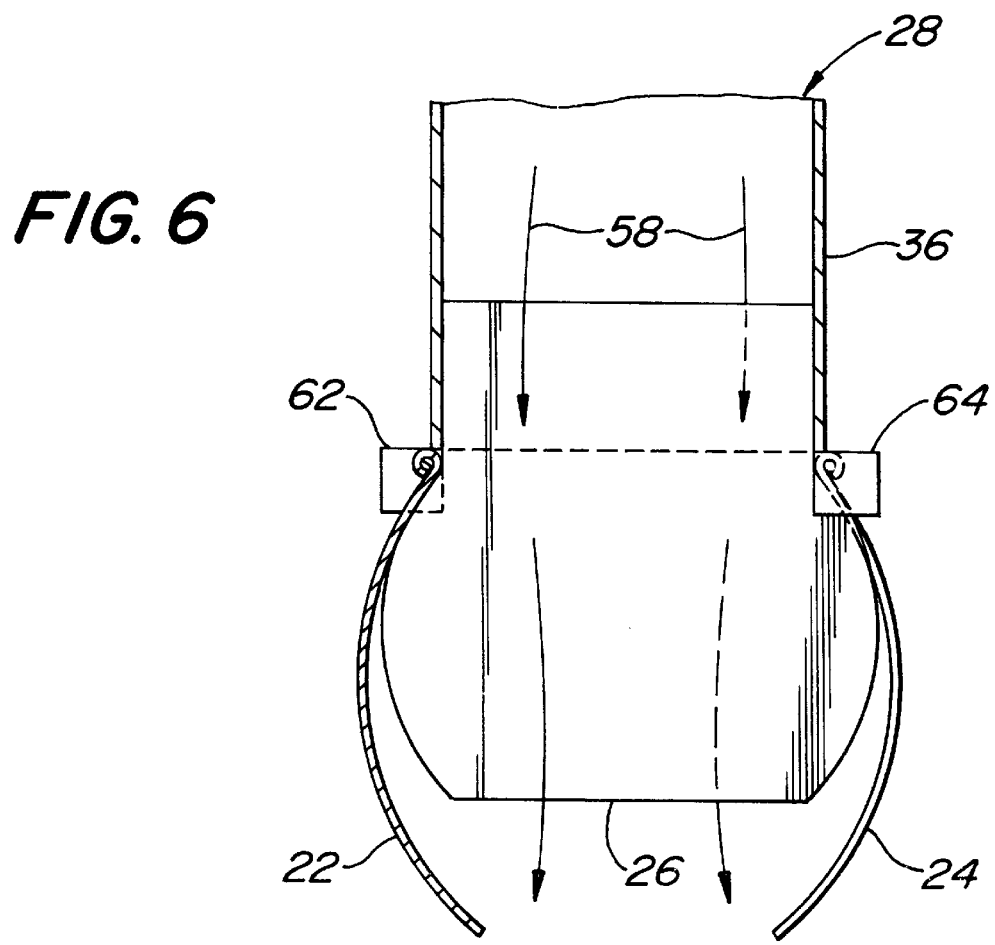
FIG. 6 is a cross-sectional view illustrating the exhaust deflectors of FIG. 5 in a second and more open position.
Figure 12:
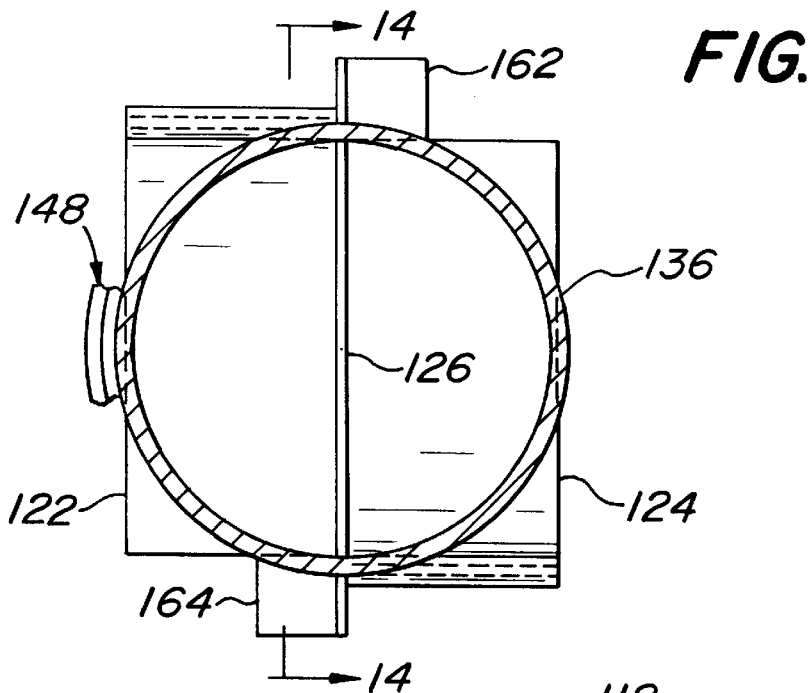
FIG. 12 is a cross-sectional view, partially broken away, taken along line 12—12 of FIG. 10.

Exhaust deflectors 22 and 24 are shown in another position in FIG. 5 wherein, although rotation of the center core tube 28 is provided, the exhaust output is substantially obstructed to maximize deflection of exhaust gases into air or exhaust plenum 50.

Figure 4:
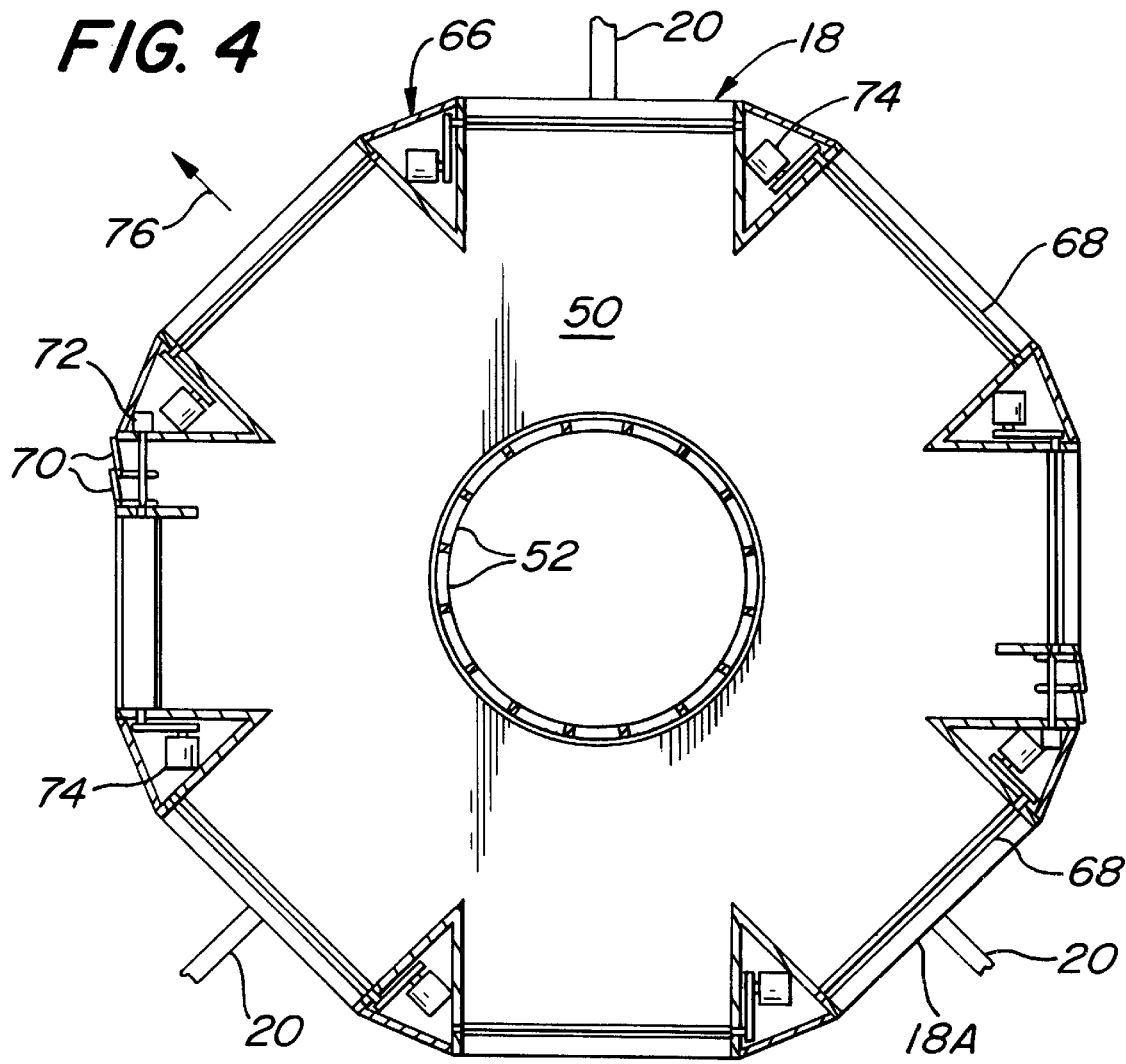
FIG. 4 is a cross-sectional view taken along line 4—4 of FIG. 1.

Referring now more particularly to FIG. 4 taken in conjunction with FIGS. 2 and 1, the exhaust or air plenum 50 is shown with the openings 52 in central core tube section 36 feeding exhaust into plenum 50. The outer circumference 66 of air plenum 50 is provided with a plurality of lateral motion jet ports 18, each of which are controllably opened or closed by a plurality of vanes 68. As may be best seen in FIG. 1, in a presently preferred embodiment, two vanes would be utilized in each opening, however, it is understood that more or less vanes may be utilized depending upon the preference of the designer, and it is explicitly stated that a single vane could be utilized or it is contemplated that ten or more vanes could be utilized to controllably open and close each lateral motion jet port 18.

In addition to the horizontally arranged controllable vanes 68, a plurality of the lateral motion jet ports may be provided with controllable vanes 70 position in a vertical attitude to controllably direct the flow of exhaust gases in a direction counter to the direction of rotation of envelope 12 thereby providing a counter-rotation or stabilization force to maintain plenum 50 as well as payload compartment 16 non-rotating. Vanes 70 compensate for the fact that bearings 46 and 48 are not perfectly frictionless. Vertical vanes 70 may be controllably operated by a suitable motor drive 72 and vane 68 may be driven by a suitable controllable motor drive 74. Both controllable motor drives 72 and 74 may be any suitable type of motor drive including electromechanical, electrical gear-driven, pneumatic, hydraulic or any other suitable drive to selectively control the position of the vanes.

The lateral motion jet ports provide a jet action to drive aircraft 10 in a particular direction. For example, if it were desired that aircraft 10 begin to move in the direction of arrow 76, the vanes 68 of lateral motion jet port 18A would be opened, preferably with all of the remaining vanes closed to prevent unwanted forces in other directions and to prevent aerodynamic drag. Of course, depending upon the amount of force needed to resist the rotation and overcome the friction of bearings 46 and 48, vertical vanes 70 are opened just sufficiently to overcome the friction of these bearings and to maintain the payload compartment, as well as plenum 50, in a stable non-rotating condition.

The rotating disc embodiment illustrated in FIGS. 1 through 6 includes four means of lift or vertically upward directed acceleration.

First, lift of the rotating, buoyant, evacuated envelope provides lift due to buoyancy. It is understood that the term "evacuated" includes partially evacuated as well as substantially or completely evacuated. This applies throughout, including use of the term in the claims unless the context of use clearly indicates otherwise. It is recognized that a perfect vacuum is not necessary and would be extremely difficult, if not impossible, in apparatus of the type disclosed.

Secondly, the exhaust from the engines as described previously, in particular with FIG. 6, provides an upward force due to the reaction of the downwardly directed exhaust gases.

Thirdly, lift is provided as a result of frictional air flow generated by the upper and lower rotating surfaces of envelope 12 (or envelope 14 in the enlarged state), as may be best seen in FIG. 1 by the direction of the air flow arrows 78 and 80. Air moves along the upper surface of the envelope and moves in an outward direction as a result of the frictional and centrifugal forces acting on it, substantially in the direction as shown by arrow 78. As this surface air leaves the envelope at its outer edge, it continues to flow until its momentum is dissipated. The shape of the envelope results in the air that leaves the upper surface having a steeper downward angle as shown by arrow 78 than the upward angle of air that leaves the lower surface as shown by arrow 80. The sum of these two air flows is a net downward air flow that provides an additional source of reaction lift for the aircraft.

A fourth means of lift is available when aircraft 10 is moving laterally through the atmosphere. When the aircraft is moving laterally, the air flow path over the upper surface of envelope 12 or 14 is longer than the air flow path over the lower surface of the envelope resulting in higher velocity air movement and lower pressure over the upper surface as compared with the lower surface of the envelope. This pressure difference provides an additional source of aerodynamic lift, sometimes referred to as air foil lift or lift in accordance with the Bernoulli effect principle.

The four sources of lift described above are not all necessarily used at the same time and in some cases, all four are not available. For example, during start up operations before the rotating evacuated envelope has reached full rotational speed and before it is fully evacuated, full envelope buoyancy is not available. Similarly, airfoil lift is not available if envelope 12 or 14 is not in lateral motion with regard to the ambient atmospheric environment, such as during a perfectly vertical take off in still air. Additionally, lift achieved through buoyancy is reduced in thinner atmospheres encountered at higher altitudes.

Requirements for lift are also variable. For example, payloads and fuel loads are variable. Additionally, gravitational effects are reduced at higher altitudes thereby reducing lift requirements. Combinations of buoyancy lift and air foil lift may be used for take offs that are not strictly vertical, but are accomplished in a relatively small area, as compared to winged aircraft. The rotating disk embodiment described with respect to FIGS. 1 through 6 may incorporate a comprehensive lift management control system that integrates and controls all lift sources and lift requirements at every instant of time.

Aircraft descent is primarily accomplished by making the aircraft heavier and this may be done by pumping air into envelope 12 by means of the envelope pressure pump 44. Aircraft lift may also be reduced to assist in the descent process by reducing the rate of rotation of the envelope and by reducing the rate of lateral motion with respect to the ambient atmosphere.

The fact that multiple, complementary sources of lift are incorporated in the rotating disk embodiment means that no one of them must be sized to accommodate all lift requirements. This may provide a significant improvement in efficiency and economy as compared to alternative aircraft lift approaches.

Additionally, since the rotating disk embodiment incorporates multiple, complementary sources of lift, this built in redundancy factor adds to the safety margin of the vehicle. It is further noted that unique advantages in efficiency and economy are produced by the fact that one power source may serve all four power needs of the aircraft, although some of these may be provided by other power sources, such as additional engines for redundancy. The four power requirements include:

1. Power to rotate the buoyant, evacuated envelope;
2. Power to be used as an extra source of vertical thrust for special situations (such as "popping" the aircraft off the ground during a take off operation);
3. Power for lateral motion jet ports to provide lateral acceleration and braking; and
4. Power to operate the payload compartment counter rotation jet ports.

The rotating disk embodiment of FIGS. 1 through 6, if optimized for very high speed lateral motion, also offers significant benefits in the area of aerodynamic heating. A major component of the vehicle that impinges on the atmosphere is the envelope 12 and this component rotates. Therefore, heat absorbed by each portion of the envelope 12, while it is in the leading edge position is dissipated during the time that the portion is not in the leading edge position. Additionally, the rotating disk embodiment is not fully dependent on the action of an airfoil, or wing, for lift which also reduces aerodynamic heating.

The rotating disk embodiment also provides substantial platform stability resulting from the gyroscopic action of the rotating envelope.

An example of an evacuated rotating disk envelope aircraft, for purposes of illustration, and not by way of limitation, may be represented by the following general parameters concerning some of the major system components.

| Envelope: (General shape per FIG. 1) | |
| --- | --- |
| Diameter - | 30.0 m |
| Height - | 5.53 m |
| Material - | Carbon fiber in plastic, metal or ceramic matrix (or equivalent); 0.09 cm thick; weighing approx. 900 g/m² (average) |
| Surface area - | 1555 m² |
| Displacement - | 2160 m³ 2790 kg of air at sea level |
| Engine(s) thrust capacity - | 1200 to 1700 kg (static) |

-continued

Weight Distribution:

| | | |
|---|---|---|
| Envelope (96% evacuation) | 1450 kg | 52% |
| Core Tube, Engine(s) & Fuel | 530 | 19 |
| Payload Compartment | 445 | 16 |
| Payload | 365 | 13 |
| | 2790 kg | 100% |

Centrifugal Force:

Formula -
$$F = \frac{Pi^2 \times S^2 \times M \times R}{900}$$

Where:

| | | |
|---|---|---|
| F | = | Force in dynes (1 g = 980 dynes @ 1G acceleration) |
| S | = | Revolutions per minute (RPM) |
| M | = | Mass in grams |
| R | = | Radius in centimeters |

Application of Envelope general design parameters:

Outward force acting on 1.0 cm² of Envelope material at periphery to be 1.50 times atmospheric pressure at sea level (sea level atmospheric pressure = 1.013 × 10⁶ dynes per cm²)
Therefore -

$$S^2 = \frac{900 \times F}{Pi^2 \times M \times R}$$

$$= \frac{900 \times 1.50 \times 1.013 \times 10^6}{Pi^2 \times 0.090 \times 1500}$$

$$S^2 = 1{,}026{,}385$$

$$S = 1{,}013 \text{ RPM}$$

Referring now to FIGS. 7 through 15, there is shown another embodiment of the present invention which utilizes a rotating evacuated cylinder as the rotating evacuated envelope for the aircraft. Referring now, more particularly, to FIG. 7 there is shown a rotating evacuated envelope aircraft 90 which includes a rotating evacuated envelope in the form of a rotating evacuated cylinder 92. Aircraft 90 is provided with a non-rotating payload compartment 96 on which there is formed or attached direction control vanes 94, 95 and 104. Direction control vane 105 is shown in the front elevation view of FIG. 8. Direction control vanes 94, 95, 104 and 105, formed or mounted on non-rotating payload compartment 96 are used to control and change the direction of the aircraft when it is moving forward (in the direction of arrow 102) with respect to ambient atmosphere. Each opposing pair of vanes, such as 94 and 95 operate together. The vanes may be operated such that they rotate on an axis normal to the exterior surface of payload compartment 96. Of course, variations in the number of vanes and the arrangement of the vanes is within the scope and spirit of the present invention. More or less vanes may be utilized.

Payload compartment 96 may preferably be provided with a weight distribution organized such that its center of gravity is considerably below the center line of aircraft 90 and may carry goods, people and/or weapons as described with respect to the previous embodiment. Although payload compartment 96 is not shown with viewing ports, it could be equipped with them if so desired. Further, external viewing by electronic means as described previously may be preferred as being more efficient and more economical.

As may be best seen in FIGS. 7 and 8, aircraft 90 may be provided with relatively inexpensive and lightweight landing gear 100, similar in nature to that provided in the previous embodiment.

Continuing to refer most particularly to FIG. 7, a non-rotating attitude control section 98 is provided aft of rotating buoyant evacuated cylinder 92. Non-rotating attitude control section 98 is provided with vertical and lateral jet motion ports 118. Jet motion ports may also be directed between horizontal and vertical, and this is illustrated in the drawings. The vertical and lateral jet motion ports 118 will be described more fully hereinafter particularly with respect to FIG. 13.

Continuing to refer to FIG. 7, taken with FIG. 8, there is shown an air intake 114. Referring to FIG. 8, there is also visible fuel tank 132 seen when viewing the forward section of core tube 134. Reference may also be had to FIGS. 9 and 10 for a better view of this structure.

Continuing to refer to FIG. 7, there is shown an exhaust divider plate 126 with moveable exhaust deflector 122 as well as moveable exhaust deflector 124 shown in dotted lines as it is located behind divider plate 126.

Referring now to drawing FIGS. 7 through 15, the air flow through the central core tube and its division into two flow streams by exhaust divider plate 126 and deflection by moveable deflectors 122 and 124 is similar to that described in detail with respect to the previous embodiment. Briefly, air enters at the front center air intake 114 and is caused to flow through a smaller forward section of core tube 134 as well as somewhat larger aft core tube section 136 which includes engine 130. Engine 130 may be any suitable engine as described above with respect to engine 30.

The exhaust from engine 130 is shown by arrows 154 and continues at least in part to be divided by divider plate or baffle 126 and deflected by moveable deflectors 122 and 124 as shown by arrows 108 and 110 to cause the central core tube with the attached engine and rotating cylindrical envelope 92 to rotate.

As described with respect to the previous embodiment, the position of exhaust deflectors 122 and 124 may be controlled by suitable control means 162 and 164, which may be any suitable type of control means including gears driven by electric motors, pneumatic, hydraulic or other suitable controllable drive means as described above.

Figure 14:
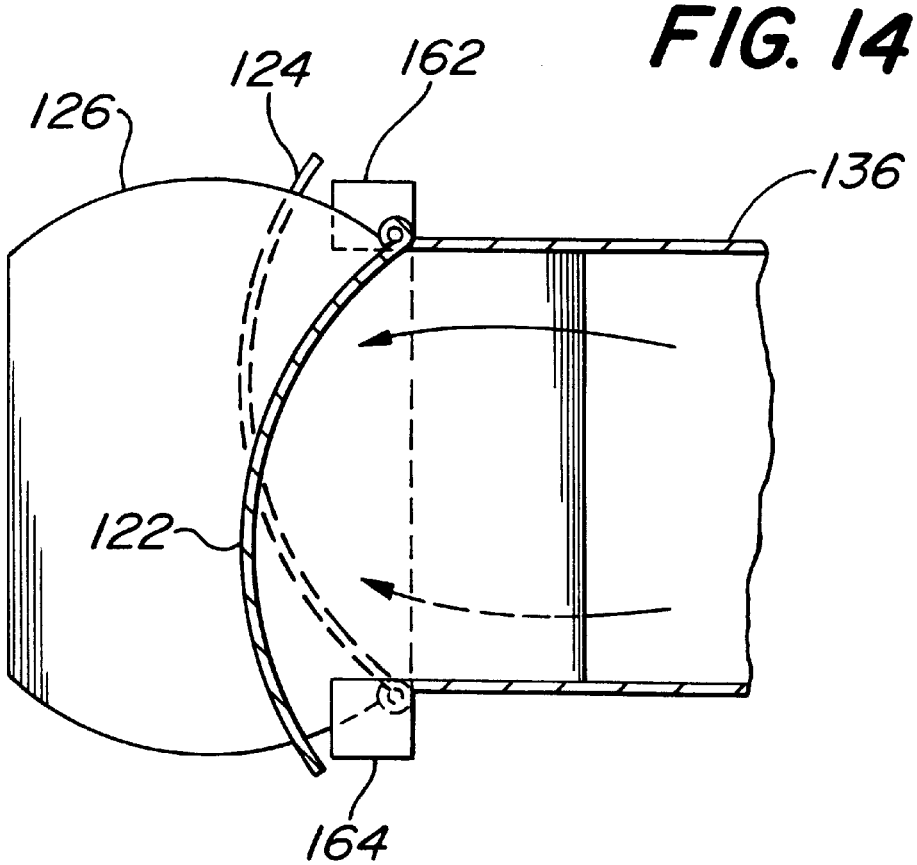
FIG. 14 is a cross-sectional view taken along line 14—14 of FIG. 12.
Figure 15:
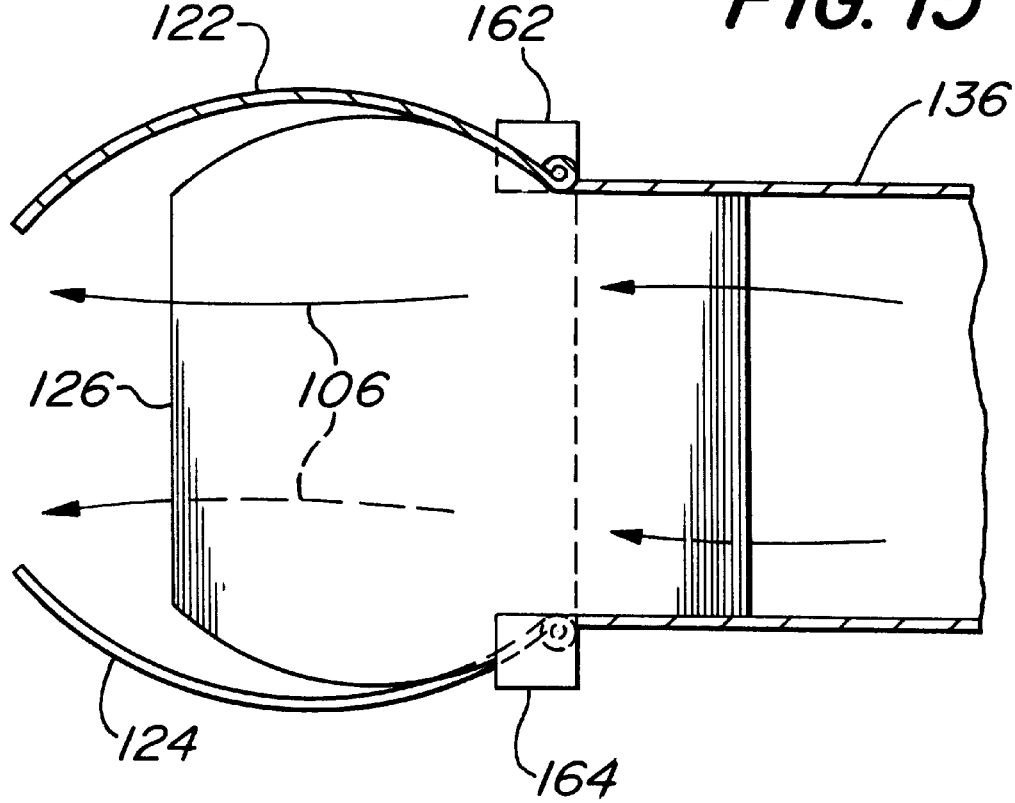
FIG. 15 is a cross-sectional view showing the exhaust deflectors of FIG. 14 in a second and more open position.

Exhaust deflectors 122 and 124 are shown in other positions in FIGS. 14 and 15. In FIG. 15, deflectors 122 and 124 are operated by their control devices 162 and 164, respectively, to be substantially open resulting in maximum thrust caused by exhaust flow in the direction of arrows 106. This also minimizes the air flow through openings 152 in core tube 136.

In FIG. 14, exhaust deflectors 122 and 124 are shown in a substantially closed or obstructed position, although there is still some exhaust flow there through for exerting some rotational force on core tube 136 and the structures attached thereto, such as rotating cylinder 92. However, positioning deflectors 122 and 124 in a position similar to that shown in FIG. 14 substantially increases the exhaust gas flow through openings 152 into plenum 150 of non-rotating attitude control section 98.

Figure 13:
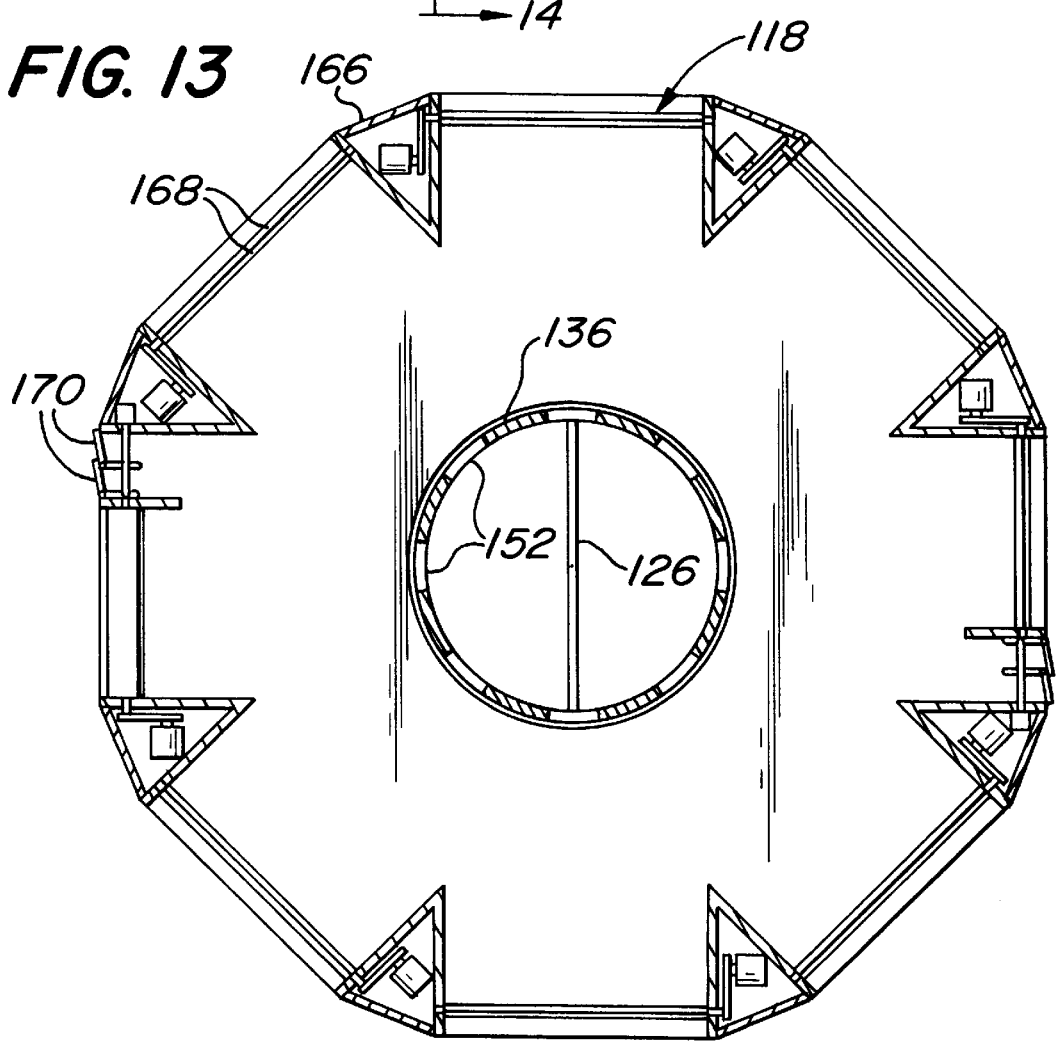
FIG. 13 is a cross-sectional view taken along line 13—13 of FIG. 7.

Referring now more particularly to FIG. 13 taken in conjunction with FIGS. 7 and 10, the exhaust or air plenum 150 is shown as receiving exhaust through openings 152 and central core tube section 136. The outer circumference 166 of air plenum 150 is provided with a plurality of vertical and lateral motion jet ports 118, each of which are controllably opened or closed by a plurality of vanes 168 as may be seen in FIGS. 7 and 13. Preferably two vanes may be used in each opening, however, this structure may be similar to that described with respect to FIG. 4, and it is understood that more or less vanes may be utilized.

In addition to vanes arranged such that their longitudinal direction is in the direction of the circumference of aircraft 90, a plurality of stabilization vanes 170 may be utilized to allow controllable amounts of exhaust flow to counteract rotation of the attitude control section 98. This may be necessary because bearings 146 and 148 for mounting the attitude control section to core tube 136 cannot be made perfectly frictionless. Stabilization vanes 170 are similar to vanes 70 described with respect to the previous embodiment.

The non-rotating attitude control section 98, as well as the payload section, is constructed and designed with its weight distribution organized such that the center of gravity is considerably below the center line of the aircraft, thereby insuring that landing will be on landing gear 100. Further, by controlling vanes 168, the exhaust gases through jet ports 118 may assist in landing and in vertical take off. When exhaust deflectors 122 and 124 are closed, maximum thrust is provided through selected jet port, those aimed in the direction of landing gear 100, to provide maximum vertical thrust for vertical take off. Further, by controlling vanes 168, the aircraft may be navigated, that is by providing a lateral thrust for turning the aircraft during flight. In the embodiment shown in FIG. 7, maximum speed in the direction of arrow 102 is achieved during flight with deflectors 122 and 124 in a substantially open position, while being controlled such that sufficient rotational torque is provided on the center core tube and the rotating evacuated envelope 92 to prevent collapse of envelope 92 when evacuated. Struts or gussets 138 in FIG. 9 and 140 in FIG. 10 are provided to help support the end walls of cylinder 92 when it is evacuated.

As described with respect to the previous embodiment, the rotating evacuated envelope in the form of rotating cylinder 92 is evacuated by envelope vacuum pump 142. Air is pumped into cylinder 92 by envelope pressure pump 144 as needed. As described previously, air may be pumped into the evacuated envelope for landing, as well as for maintaining altitude and other control during flight as well as for generally maintaining the degree of evacuation of the evacuated rotating envelope of the aircraft.

As with the previous embodiment, the non-rotating payload compartment 96 is provided with a wall 160 separating it from the central rotating core tube 134 as may be best seen in FIG. 9. Also referring to FIG. 9, payload compartment 96 is mounted on bearings 86 and 88.

In operation, the embodiment of FIGS. 7 through 15 operates on the principle of the buoyancy of an evacuated envelope wherein the envelope is in the form of a cylinder and its structural rigidity is enhanced by rotating the cylinder at a sufficient rotational velocity thereby enabling the structure to be maintained in its evacuated condition with a minimum of structural weight. The aircraft may be utilized for vertical landing and take off due to the evacuation of the rotating cylinder which is complemented by the thrust provided by selected vertical jet ports 118. Further, other jet ports 118 may be utilized for navigation and attitude control during flight. As previously described, the rotation of attitude section 178 may be stabilized by exhaust thrust provided by controllable opening of stabilization vanes 170. Further, additional forward thrust may be provided by suitable engines, such as jet engines, turbojet or turbofan engines, on aircraft 90. A possible jet engine for forward motion is shown in dotted lines 172 on FIG. 7, mounted on the payload compartment. A similar engine would be mounted on the other side of the payload compartment, and this is not shown. Small jet engines may be mounted as shown in dotted lines at 174 on payload compartment 96 to stabilize the payload compartment against rotation. Other variations will be apparent to those skilled in the art.

Figure 16:
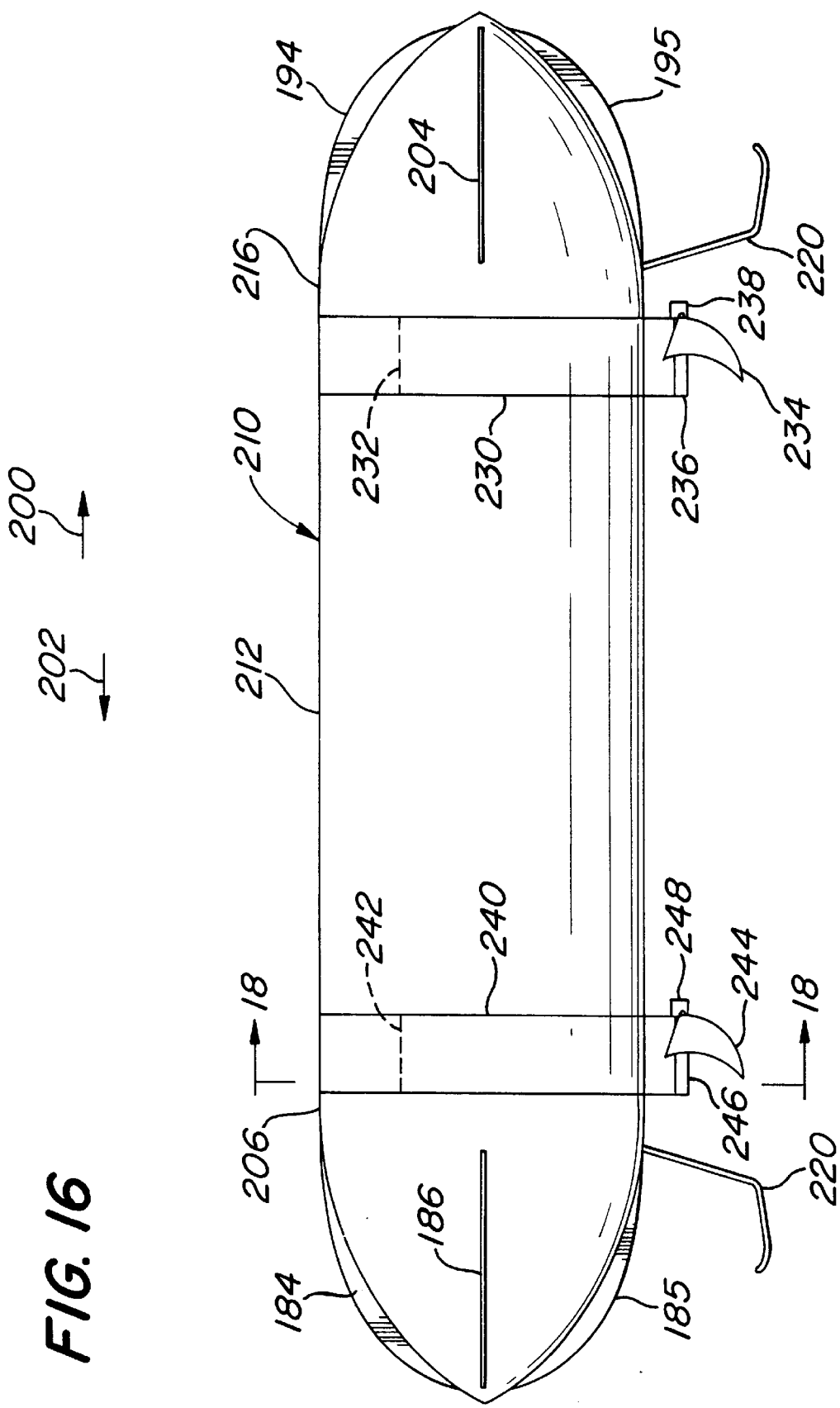
FIG. 16 is a side elevation view of a third embodiment of the present invention, illustrating another embodiment of an evacuated rotating envelope in the form of a cylinder.
Figure 17:
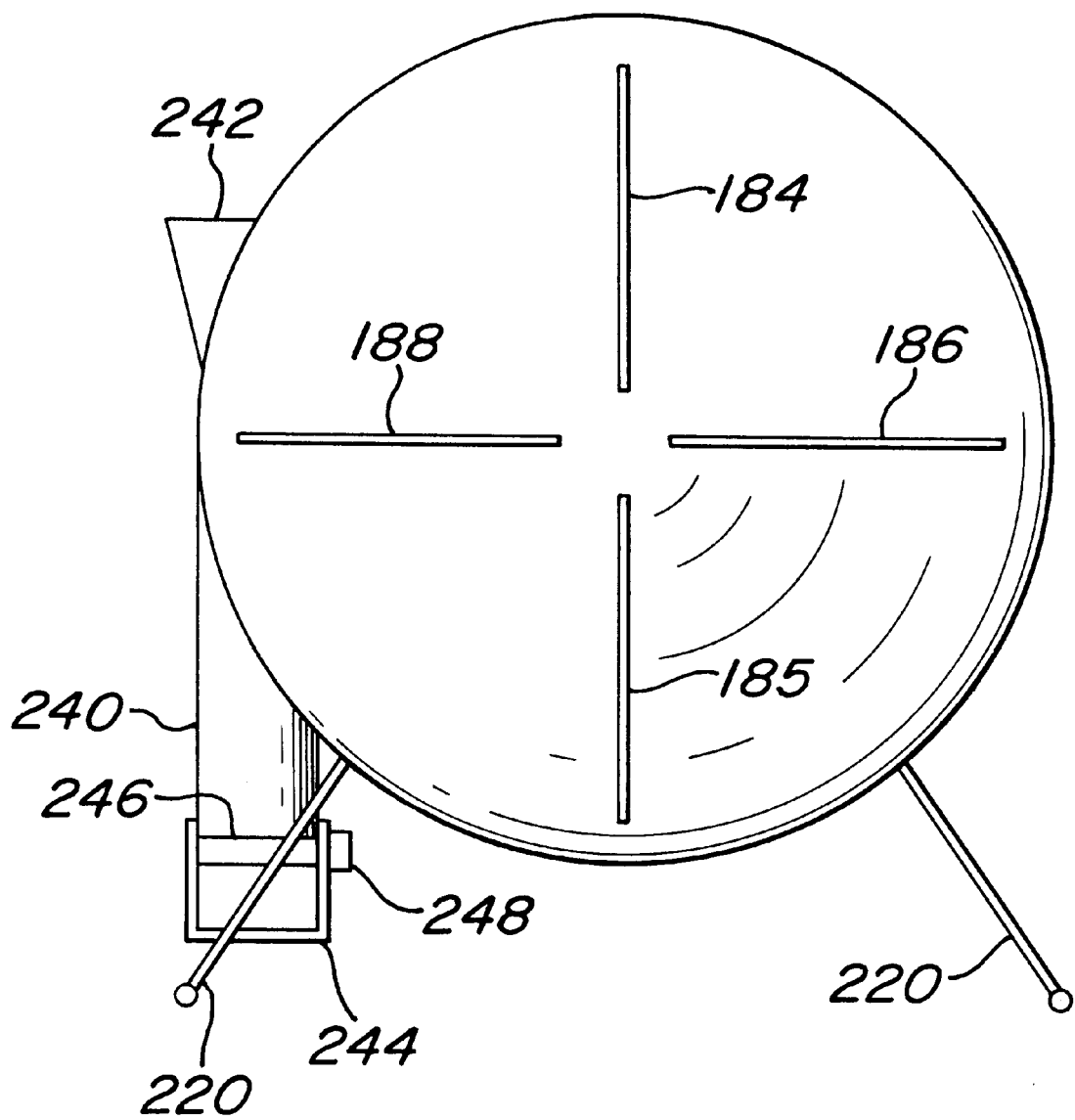
FIG. 17 is a rear elevation view of the embodiment shown in FIG. 16.
Figure 18:
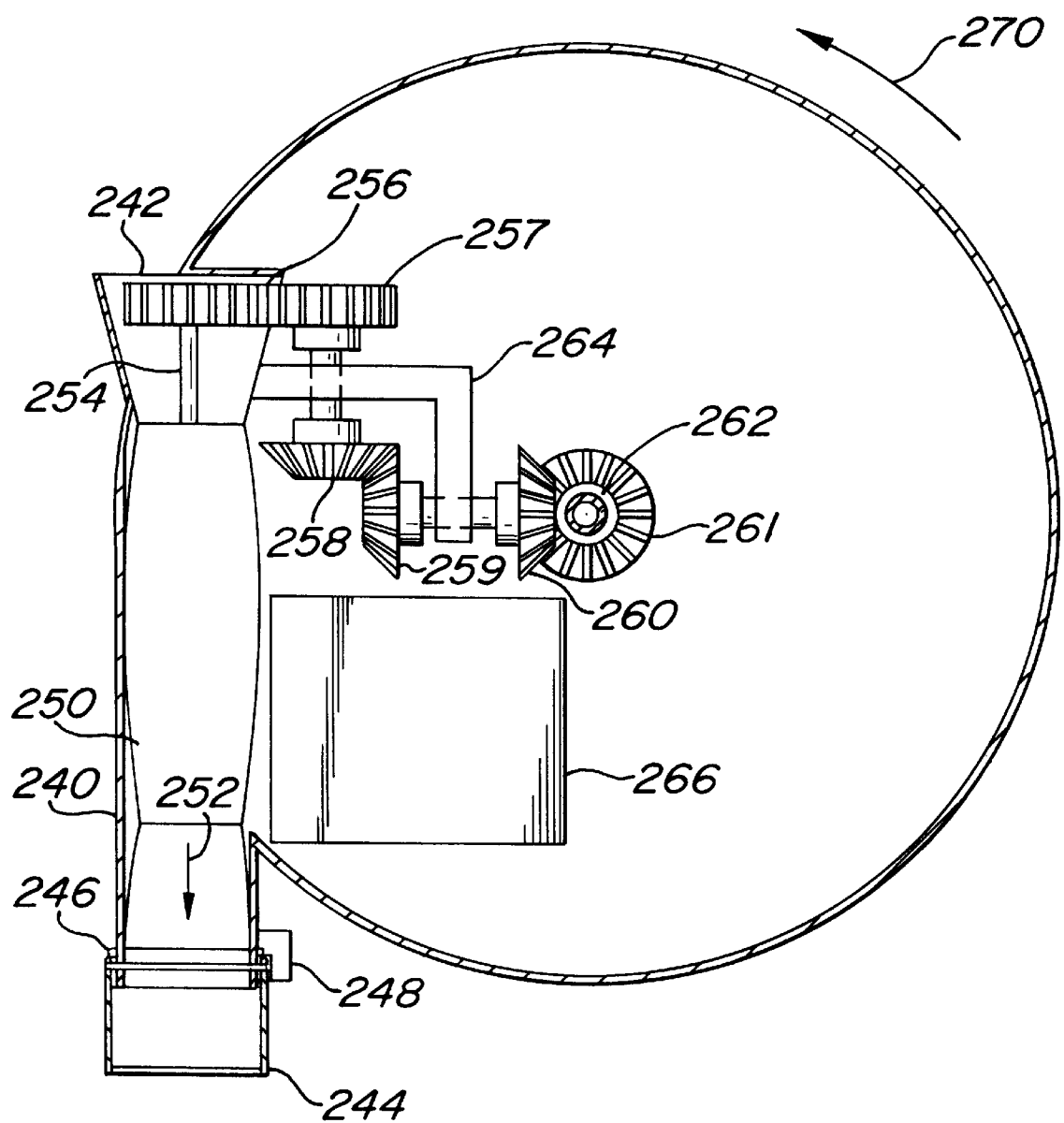
FIG. 18 is a cross-sectional view taken along line 18—18 of FIG. 16.

Referring now to FIGS. 16, 17 and 18, there is shown another embodiment of the present invention which utilizes a rotating evacuated envelope wherein the evacuated envelope is rotated such that the centrifugal force reduces the need for structural components and accordingly the weight of such structural components. The rotating evacuated envelope aircraft 210 utilizes a rotating evacuated cylinder 212 as its rotating evacuated envelope. Aircraft 210 is provided with two non-rotating payload compartments 206 and 216. Payload compartment 216 is provided with directional control vanes 194 and 195 as well as 204 and one opposite 204 (not shown). Directional control vanes 194, 195, and 204, being shown, are used and operate in a manner similar to that described with respect to directional control vanes 94, 95, 104 and 105 in the previous rotating cylindrical embodiment. Payload compartment 206 is provided with similar directional control vanes 184, 185, 186 and 188. There is another vane on the back side of FIG. 16, opposite of vane 204, which is not shown. As may be suggested by the shapes of non-rotating payload compartments 206 and 216, aircraft 210 is adapted to fly in the direction of arrow 200 or arrow 202.

Aircraft 210 is provided with inexpensive and lightweight landing gear 220 similar to that described with respect to the previous embodiments. Aircraft 210 is preferably provided with two non-rotating power units 230 and 240. However, it is understood that a single power unit or more than two power units may be utilized. Power unit 230 is provided with an air intake 232 and power unit 240 is provided with an air intake 242. Power unit 230 is provided with a rotatable exhaust deflector 234 mounted on a deflector rotation ring 236. A controllable drive 238 is provided for exhaust deflector 234. Similarly, power unit 240 is provided with a rotatable exhaust deflector 244 mounted on a deflector rotation ring 246 and operated by a controllable drive 248.

The exhaust deflectors 234 and 244 are both shown in FIG. 16 to deflect the engine exhaust in a rearward direction, that is in the direction of arrow 202 thereby causing propulsion of aircraft 210 in the forward direction of arrow 200. The exhaust deflectors 234 and 244 may be rotated on their respective deflector rotation rings 236 and 246 such that the engine exhaust may be directed to the right, to the left, in a forward direction or in any other intermediate direction. By directing the exhaust in the direction of forward direction shown by arrow 200, the aircraft can be made to fly in the direction of arrow 202. Further, by directing the deflector sideways, the aircraft 210 may be moved laterally, or by directing one deflector into the right and the other to the left, the aircraft may be caused to rotate or turn rapidly. Of course, the deflectors may be adjusted to any intermediate position for maneuvering or navigation.

The exhaust deflectors 234 and 244 are controllably operated by control drives 238 and 248, which may be similar to the control drives described previously with respect to exhaust deflector drive 62 and 64. The adjustment of the exhaust deflectors, as to the degree of opening, allows them to be positioned for maximum lateral thrust as shown in FIG. 16 or for maximum vertical thrust when fully opened or in any other intermediate position as may be dictated by flight, landing or take off requirements.

As described with respect to previous cylindrical embodiment, the payload compartments 206 and 216 may preferably have their weight distribution organized such that their centers of gravity are considerably below the central axis of the aircraft thereby insuring proper landing on landing gear 220 as well as stabilization in an appropriate orientation during flight without the expenditure of energy. Payload compartments 206 and 216 may carry goods, people, weapons or the like as previously described with respect to the other embodiments. Preferably, payload compartments 206 and 216 should be managed to be approximately equal weight when loaded. However, this may be adjusted by adjusting the output exhaust power of power units 230 and 240.

The outside of each payload compartment 206 and 216 is provided with the vanes as previously described. These vanes, as described with respect to the previous embodiment are moveable such that each opposing pair is operated together and rotated about axis normal to the external surface of the payload compartment under each vane. The vanes are used to control and change the direction of the vehicle when it is moving with respect to ambient atmosphere. The vanes as well as structure of the air intake 242 and rotatable exhaust deflector 244 are further illustrated in FIG. 17.

Referring now more particularly to FIG. 18, there is shown a cross-sectional view through power unit 240. There is shown in FIG. 18 an engine 250 which may be a turbojet, turbofan or any other suitable type of engine for producing an exhaust which exits in the direction of arrow 252. The output drive of engine 250 is fed via shaft 254 and gears 256 through 261 on their associated shafts to transmit the output of engine 250 to rotate a center drive shaft 262. Gears 256 through 261 may be appropriately journalled on the support structure, such as structure 264 and gear shaft which are of conventional structure. Furthermore, it is understood that any suitable type of drive may be utilized to transmit the output energy of engine 250 to drive the center shaft 262. Evacuated rotating cylinder 212 is integrally connected to drive shaft 262 and rotates with drive shaft 262. Gussets may be provided to reinforce the end walls of rotating evacuated cylinder 212 as was provided with respect to rotating evacuated cylinder 92. As illustrated in FIG. 18, fuel tank 266 is mounted offset from drive shaft 262 as one of the elements providing a center of gravity for the power unit offset from the center of aircraft 210.

Referring most particularly to FIG. 18, engine 250, the gear train comprised of gears 256 through 260 and fuel tank 266, are all shown to the left of the center shaft 262 about which the entire power unit is free to rotate. In a quiescent state with the engine 250 turned off, the weight of engine 250, the gear train and fuel tank 266 would cause them to rotate counter clockwise approximately 45 degrees and come to rest at a point where their combined center of gravity would be directly below center shaft 262. However, during normal, power-on operation, the resisting force exerted by the power unit 240 and its contained components by the center shaft drive gear 261 causes engine 250, the gear train and fuel tank to take the positions as shown in FIG. 18. The rotating envelope 212 encounters frictional air resistance which impedes its free rotation. The direction of envelope rotation is indicated by arrow 270 in FIG. 18. This frictional resistance to rotation is opposite to the direction of arrow 270 and is communicated from the outside surface of envelope 212 to the envelope and to the connected center shaft 262 and to the attached center shaft drive gear 261. However, it is understood that engine 250 and its associated air intake and other components may be located on the other side and the direction of envelope rotation would be reversed.

As described with respect to the previous embodiment, the non-rotating payload compartments and power units will be isolated from the center rotating shaft 262 by suitable bearings.

In operation, rotating evacuated envelope aircraft 212 operates in principle similar to the other embodiments. Exhaust deflectors 234 and 244 may be opened widely for a vertical take off. Evacuated rotating cylinder 212 is also provided with an evacuation pump and a pressure pump. Accordingly, for take off, rotating cylinder 212 is evacuated by the evacuation pump and lift is accordingly provided both by the buoyancy of the evacuated rotating cylinder 212 as well as the vertically downward directed exhaust of power units 230 and 240.

Once suitable altitude is reached, the exhaust deflectors may be positioned as shown in FIG. 16 to produce a substantial thrust forcing aircraft 210 to fly in the forward direction of arrow 200. Sharp turns or maneuvers may be made by adjusting the direction of exhaust ports 234 and 244 by rotation on their respective deflector rotation rings 236 and 246. Further, for navigation and attitude control, the deflector vanes located on the payload compartments may be used and adjusted for optimum flight conditions. Further, lateral movement of the craft may be accomplished by appropriate rotation and adjustment of the exhaust deflectors 234 and 244.

Figure 19:
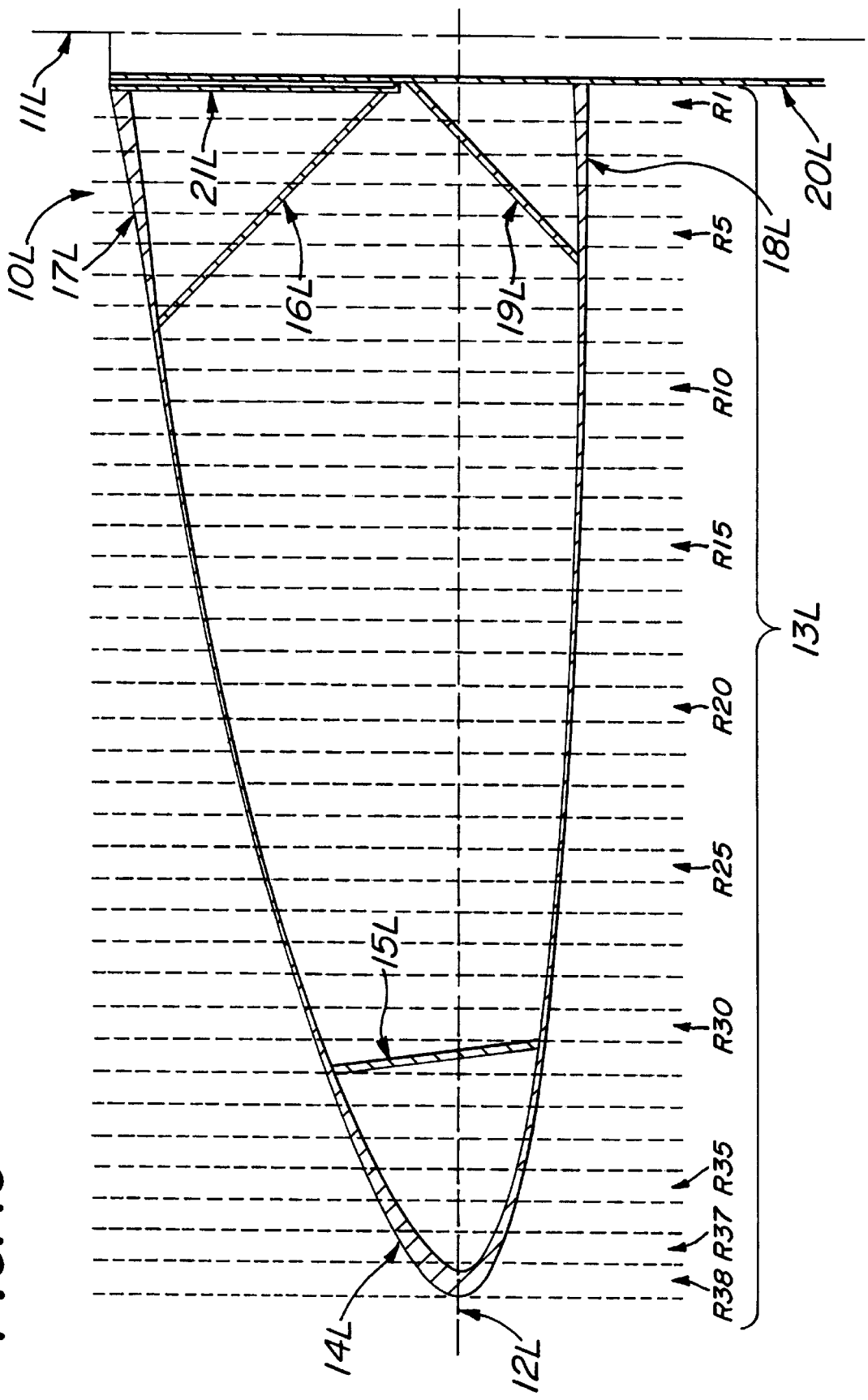
FIG. 19 is a cross-sectional view of an evacuated rotating disk embodiment of a rotating envelope illustrating possible reinforcing structures and an approach to analysis of forces on the structure.

Referring now to FIGS. 19 and 20, there is shown additional information relating to an evacuated rotating envelope aircraft having a rotating envelope in the form of a rotating disk. Shown therein are possible locations of reinforcement of the disk or envelope of such a model as well as a presently preferred embodiment. However, it is understood that this is only an example of a presently preferred embodiment and is subject to change and is not intended in any way to limit the claimed invention. In accordance with the segmenting of the structure into radial concentric rings as shown in FIGS. 19 and 20 in the following chart, there is provided an analysis of forces acting on the external envelope while it is rotating in the evacuated state.

The envelope chosen for the purposes of this model is approximately 30 meters in diameter in the horizontal plane and about 5.5 meters in height or thickness in a vertical direction at its axis of rotation. Since the envelope is symmetrical about its axis of rotation, the analysis considers only one side of the envelope with it being assumed that equivalent and opposite inertial forces are acting on the other side of the envelope.

The model is not intended to be exactly precise in all details but is aimed at providing a satisfactory degree of confidence concerning implementation feasibility. In accordance with conventional aircraft design practice, further detailed modeling, simulation and design in accordance with specific material selections for each portion of the envelope and each component of the operating aircraft is contemplated.

A side elevation cross section diagram of the half-envelope chosen for the model is shown in FIG. 19. The envelope is represented by 10L. The vertical axis of rotation and symmetry of the envelope is represented by the dotted and dashed line at 11L. The horizontal median of the envelope is the dashed line at 12L. The inside core tube of the aircraft is represented by 20L, and the outside core tube is represented by 21L. The core tube may be approximately 1.0 meter in diameter for the purposes of this model.

A plan view of the model is shown in FIG. 20. Here also can be seen the axis of rotation 11L, the inside core tube 20L, the outside core tube 21L and a top view of the horizontal median line 12L.

The horizontal median of the envelope 12L is divided into 38 equal width segments as indicated at 13L of FIG. 19 beginning at the outside of the core tube, each segment being 0.3947 meter wide. Each of these 38 segments can be visualized as an adjacent and concentric cylinder sharing a common center line which is the axis of rotation of the envelope 11L. Each of these 38 cylinders intersects the material of the upper surface of the envelope dividing the upper envelope surface material into 38 adjacent and concentric rings each of which is numbered from Ring 38 at the outside edge of the envelope to Ring 1 as the innermost ring, which is adjacent to the outer core tube 21L. Analysis of the forces acting on the material of the lower surface of the envelope may be done in a similar fashion.

Now referring to the chart below which is entitled "Metric for 30 Meter Diameter Model", a vertical column for each of the 38 rings to be analyzed can be seen.

| Metric for 30 Meter Diameter Model | | | | |
|---|---|---|---|---|
| Row | Description | Ring 38 | Ring 37 | Ring 36 |
| 1 | Degrees from Horizontal - upper surface | 90 | 37 | 29 |
| 2 | SIN of angle | 1.000 | 0.602 | 0.485 |
| 3 | COS of angle | 0.000 | 0.799 | 0.875 |
| 4 | Horizontal Width of Each Ring (meter) | 0.3947 | 0.3947 | 0.3947 |
| 5 | Number of .3947 m. Wide Segments in Each Ring | 243.58 | 237.30 | 231.01 |
| 6 | Segment Radial Height Along Surface (meter) | 0.3947 | 0.4942 | 0.4513 |
| 7 | Area of a Segment - (square meters) | 0.1558 | 0.1951 | 0.1781 |
| 8 | Mass of Material - (grams per square meter) | 898 | 898 | 898 |
| 9 | Mass of a Segment (grams) | 139.9 | 175.2 | 160.0 |
| 10 | Radius of Center of Ring - (meters) | 15.30 | 14.91 | 14.51 |
| 11 | Rate of Rotation (RPM) | 1014 | 1014 | 1014 |
| 12 | Segment Inertial Force - (dynes × $10^6$) | 2,414 | 2,944 | 2,617 |
| 13 | Segment Inertial Force - (grams × $10^6$ (@ 1 G)) | 2.463 | 3.004 | 2.671 |
| 14 | Segment Inertial Force In Surface (grams × $10^6$) | 0.000 | 2.399 | 2.336 |
| 15 | Seg. Inertial Force Surface Normal (grams × $10^6$) | 2.463 | 1.808 | 1.295 |
| 16 | Atmos. Pressure on a Segment (grams × $10^6$) | 1.610 | 2.016 | 1.841 |
| 17 | Atmos. Pres. Minus Normal Inert. Force (grams × $10^6$) | −0.853 | 0.208 | 0.546 |
| 18 | Cum. Seg. Inertial Force in Surface (grams × $10^6$) | 2.46 | 4.93 | 7.40 |

| Row | Ring 35 | Ring 34 | Ring 33 | Ring 32 | Ring 31 | Ring 30 |
|---|---|---|---|---|---|---|
| 1 | 25 | 22 | 20 | 19 | 18 | 17 |
| 2 | 0.423 | 0.375 | 0.342 | 0.326 | 0.309 | 0.292 |
| 3 | 0.906 | 0.927 | 0.940 | 0.946 | 0.951 | 0.956 |
| 4 | 0.3947 | 0.3947 | 0.3947 | 0.3947 | 0.3947 | 0.3947 |
| 5 | 224.73 | 218.45 | 212.16 | 205.88 | 199.60 | 193.31 |
| 6 | 0.4355 | 0.4257 | 0.4200 | 0.4174 | 0.4150 | 0.4127 |
| 7 | 0.1719 | 0.1680 | 0.1658 | 0.1648 | 0.1638 | 0.1629 |
| 8 | 898 | 898 | 898 | 898 | 898 | 898 |
| 9 | 154.4 | 150.9 | 148.9 | 148.0 | 147.1 | 146.3 |
| 10 | 14.12 | 13.72 | 13.33 | 12.93 | 12.54 | 12.14 |
| 11 | 1014 | 1014 | 1014 | 1014 | 1014 | 1014 |
| 12 | 2,457 | 2,335 | 2,237 | 2,158 | 2,080 | 2,003 |
| 13 | 2.507 | 2.382 | 2.283 | 2.202 | 2.122 | 2.044 |
| 14 | 2.272 | 2.209 | 2.145 | 2.082 | 2.018 | 1.955 |
| 15 | 1.060 | 0.892 | 0.781 | 0.717 | 0.656 | 0.598 |
| 16 | 1.777 | 1.737 | 1.714 | 1.703 | 1.693 | 1.684 |
| 17 | 0.717 | 0.844 | 0.933 | 0.986 | 1.037 | 1.086 |
| 18 | 9.88 | 12.37 | 14.88 | 17.42 | 19.98 | 22.59 |

| Row | Ring 29 | Ring 28 | Ring 27 | Ring 26 | Ring 25 | Ring 24 |
|---|---|---|---|---|---|---|
| 1 | 17 | 16 | 16 | 15 | 15 | 14 |
| 2 | 0.292 | 0.276 | 0.276 | 0.259 | 0.259 | 0.242 |
| 3 | 0.956 | 0.961 | 0.961 | 0.966 | 0.966 | 0.970 |
| 4 | 0.3947 | 0.3947 | 0.3947 | 0.3947 | 0.3947 | 0.3947 |
| 5 | 187.03 | 180.75 | 174.46 | 168.18 | 161.90 | 155.61 |
| 6 | 0.4127 | 0.4106 | 0.4106 | 0.4086 | 0.4086 | 0.4068 |
| 7 | 0.1629 | 0.1621 | 0.1621 | 0.1613 | 0.1613 | 0.1606 |
| 8 | 898 | 898 | 898 | 898 | 898 | 898 |
| 9 | 146.3 | 145.5 | 145.5 | 144.8 | 144.8 | 144.2 |
| 10 | 11.75 | 11.35 | 10.96 | 10.56 | 10.17 | 9.78 |
| 11 | 1014 | 1014 | 1014 | 1014 | 1014 | 1014 |
| 12 | 1,938 | 1,863 | 1,798 | 1,725 | 1,661 | 1,589 |
| 13 | 1.978 | 1.901 | 1.835 | 1.761 | 1.695 | 1.622 |
| 14 | 1.891 | 1.828 | 1.764 | 1.701 | 1.637 | 1.573 |
| 15 | 0.578 | 0.524 | 0.506 | 0.456 | 0.439 | 0.392 |
| 16 | 1.684 | 1.675 | 1.675 | 1.667 | 1.667 | 1.660 |
| 17 | 1.106 | 1.151 | 1.169 | 1.211 | 1.229 | 1.267 |
| 18 | 25.24 | 27.94 | 30.71 | 33.56 | 36.50 | 39.55 |

| Row | Ring 23 | Ring 22 | Ring 21 | Ring 20 | Ring 19 | Ring 18 |
|---|---|---|---|---|---|---|
| 1 | 14 | 14 | 13 | 13 | 13 | 13 |
| 2 | 0.242 | 0.242 | 0.225 | 0.225 | 0.225 | 0.225 |
| 3 | 0.970 | 0.970 | 0.974 | 0.974 | 0.974 | 0.974 |
| 4 | 0.3947 | 0.3947 | 0.3947 | 0.3947 | 0.3947 | 0.3947 |
| 5 | 149.33 | 143.05 | 136.76 | 130.48 | 124.20 | 117.92 |
| 6 | 0.4068 | 0.4068 | 0.4051 | 0.4051 | 0.4051 | 0.4051 |
| 7 | 0.1606 | 0.1606 | 0.1599 | 0.1599 | 0.1599 | 0.1599 |
| 8 | 898 | 898 | 898 | 898 | 898 | 898 |
| 9 | 144.2 | 144.2 | 143.6 | 143.6 | 143.6 | 143.6 |
| 10 | 9.38 | 8.99 | 8.59 | 8.20 | 7.80 | 7.41 |
| 11 | 1014 | 1014 | 1014 | 1014 | 1014 | 1014 |
| 12 | 1,525 | 1,461 | 1,391 | 1,327 | 1,263 | 1,199 |
| 13 | 1.556 | 1.491 | 1.419 | 1.354 | 1.289 | 1.224 |
| 14 | 1.510 | 1.446 | 1.383 | 1.319 | 1.256 | 1.192 |
| 15 | 0.376 | 0.361 | 0.319 | 0.305 | 0.290 | 0.275 |
| 16 | 1.660 | 1.660 | 1.653 | 1.653 | 1.653 | 1.653 |
| 17 | 1.283 | 1.299 | 1.333 | 1.348 | 1.363 | 1.377 |
| 18 | 42.72 | 46.04 | 49.54 | 53.25 | 57.20 | 61.44 |

| Row | Ring 17 | Ring 16 | Ring 15 | Ring 14 | Ring 13 | Ring 12 |
|---|---|---|---|---|---|---|
| 1 | 12 | 12 | 12 | 12 | 11 | 11 |
| 2 | 0.208 | 0.208 | 0.208 | 0.208 | 0.191 | 0.191 |
| 3 | 0.978 | 0.978 | 0.978 | 0.978 | 0.982 | 0.982 |
| 4 | 0.3947 | 0.3947 | 0.3947 | 0.3947 | 0.3947 | 0.3947 |
| 5 | 111.63 | 105.35 | 99.07 | 92.78 | 86.50 | 80.22 |
| 6 | 0.4035 | 0.4035 | 0.4035 | 0.4035 | 0.4021 | 0.4021 |
| 7 | 0.1593 | 0.1593 | 0.1593 | 0.1593 | 0.1587 | 0.1587 |
| 8 | 898 | 898 | 898 | 898 | 898 | 898 |
| 9 | 143.0 | 143.0 | 143.0 | 143.0 | 142.5 | 142.5 |
| 10 | 7.01 | 6.62 | 6.22 | 5.83 | 5.43 | 5.04 |
| 11 | 1014 | 1014 | 1014 | 1014 | 1014 | 1014 |
| 12 | 1,131 | 1,067 | 1,004 | 940 | 873 | 810 |
| 13 | 1.154 | 1.089 | 1.024 | 0.959 | 0.891 | 0.826 |
| 14 | 1.129 | 1.065 | 1.002 | 0.938 | 0.875 | 0.811 |
| 15 | 0.240 | 0.226 | 0.213 | 0.199 | 0.170 | 0.158 |
| 16 | 1.646 | 1.646 | 1.646 | 1.646 | 1.640 | 1.640 |
| 17 | 1.406 | 1.420 | 1.433 | 1.447 | 1.470 | 1.483 |
| 18 | 66.02 | 71.03 | 76.53 | 82.65 | 89.53 | 97.36 |

| Row | Ring 11 | Ring 10 | Ring 9 | Ring 8 | Ring 7 | Ring 6 |
|---|---|---|---|---|---|---|
| 1 | 11 | 11 | 10 | 10 | 10 | 10 |
| 2 | 0.191 | 0.191 | 0.174 | 0.174 | 0.174 | 0.174 |
| 3 | 0.982 | 0.982 | 0.985 | 0.985 | 0.985 | 0.985 |
| 4 | 0.3947 | 0.3947 | 0.3947 | 0.3947 | 0.3947 | 0.3947 |
| 5 | 73.93 | 67.65 | 61.37 | 55.08 | 48.80 | 42.52 |
| 6 | 0.4021 | 0.4021 | 0.4008 | 0.4008 | 0.4008 | 0.4008 |
| 7 | 0.1587 | 0.1587 | 0.1582 | 0.1582 | 0.1582 | 0.1582 |
| 8 | 898 | 898 | 898 | 898 | 898 | 898 |
| 9 | 142.5 | 142.5 | 142.1 | 142.1 | 142.1 | 142.1 |
| 10 | 4.64 | 4.25 | 3.85 | 3.46 | 3.07 | 2.67 |

-continued

Metric for 30 Meter Diameter Model

| 11 | 1014 | 1014 | 1014 | 1014 | 1014 | 1014 |
|----|------|------|------|------|------|------|
| 12 | 746 | 683 | 617 | 554 | 491 | 428 |
| 13 | 0.762 | 0.697 | 0.630 | 0.566 | 0.501 | 0.437 |
| 14 | 0.748 | 0.684 | 0.620 | 0.557 | 0.493 | 0.430 |
| 15 | 0.145 | 0.133 | 0.109 | 0.098 | 0.087 | 0.076 |
| 16 | 1.640 | 1.640 | 1.635 | 1.635 | 1.635 | 1.635 |
| 17 | 1.495 | 1.508 | 1.526 | 1.537 | 1.548 | 1.559 |
| 18 | 106.38 | 116.94 | 129.54 | 144.87 | 164.01 | 188.68 |

| Row | Ring 5 | Ring 4 | Ring 3 | Ring 2 | Ring 1 |
|-----|--------|--------|--------|--------|--------|
| 1 | 9 | 9 | 9 | 9 | 8 |
| 2 | 0.156 | 0.156 | 0.156 | 0.156 | 0.139 |
| 3 | 0.988 | 0.988 | 0.988 | 0.988 | 0.990 |
| 4 | 0.3947 | 0.3947 | 0.3947 | 0.3947 | 0.3947 |
| 5 | 36.23 | 29.95 | 23.67 | 17.38 | 11.10 |
| 6 | 0.3996 | 0.3996 | 0.3996 | 0.3996 | 0.3986 |
| 7 | 0.1577 | 0.1577 | 0.1577 | 0.1577 | 0.1573 |
| 8 | 898 | 898 | 898 | 898 | 898 |
| 9 | 141.6 | 141.6 | 141.6 | 141.6 | 141.3 |
| 10 | 2.28 | 1.88 | 1.49 | 1.09 | 0.70 |
| 11 | 1014 | 1014 | 1014 | 1014 | 1014 |
| 12 | 364 | 300 | 237 | 174 | 111 |
| 13 | 0.371 | 0.307 | 0.242 | 0.178 | 0.113 |
| 14 | 0.366 | 0.303 | 0.239 | 0.176 | 0.112 |
| 15 | 0.058 | 0.048 | 0.038 | 0.028 | 0.016 |
| 16 | 1.630 | 1.630 | 1.630 | 1.630 | 1.626 |
| 17 | 1.572 | 1.582 | 1.593 | 1.603 | 1.610 |
| 18 | 221.77 | 268.59 | 340.14 | 463.25 | 725.57 |

Row 1 indicates the average angle of each of the 38 rings in terms of degrees from a horizontal plane with this angle decreasing from 90 degrees at Ring 38 to 8 degrees at Ring 1. Rows 2 and 3 respectively compute the sine and cosine of this angle for use in subsequent calculations.

Row 4 notes that the horizontal, or radial, width of each Ring is 0.3947 meters for all rings.

Each ring is divided into a number of 0.3947 meter wide adjacent segments around its circumference in the plane of the median line 12L. Examples of several of these square segments are shown in FIG. 20, one of them being labeled 22L. The number of segments in a ring varies from 243.58 in the large, outer ring, Ring 38, to 11.10 segments in the smallest ring, Ring 1 adjacent to the core tube as shown on Row 5 of the chart.

At Row 6 the radial height along the surface is computed for each ring considering the angle of each ring as noted in Row 1. The radial height along the surface for Row 38 is set at 0.3947 m. Row 7 computes the area of a segment in each ring in square meters and Row 9 computes the mass of a segment in each ring based on the mass of the material of which the envelope is constructed as shown on Row 8.

In preparation for calculating the inertial force acting on a segment in each ring due to its rotation, Row 10 indicates the radius of the center of each ring in meters and Row 11 notes the rate of rotation as being 1014 revolutions per minute which is of course the same for all rings and segments.

Row 12 indicates the inertial force acting on a segment in each ring expressed in millions of dynes. This force is converted to millions of grams on Row 13 assuming the earth's gravitational environment.

The inertial force acting on a segment in each ring is then broken into two components: Row 14 expresses the inertial force component that is in the plane of the surface for a segment in each ring and Row 15 indicates the inertial force acting normal to the plane of the surface for a segment in each of the rings.

Row 16 indicates the pressure of the external atmosphere acting inwardly on a segment in each ring considering that the area of a segment depends upon its angle to the horizontal as expressed in Row 1. The atmospheric pressure acting on a segment is shown in millions of grams assuming earth's standard gravitational environment at sea level.

Row 17 subtracts the surface normal inertial force acting outwardly on a segment from the force due to atmospheric pressure acting inwardly on a segment and displays the result for each of the rings. The result indicates that the surface normal inertial force acting outwardly exceeds the force due to atmospheric pressure acting inwardly at standard conditions at sea level by about half an atmosphere at Ring 38. However the force due to atmospheric pressure is greater than the surface normal inertial force and is increasingly so as rings closer to the axis of rotation are examined for the set of conditions concerning envelope material mass and rate of rotation assumed for this model.

Row 18 computes the cumulative in surface component of inertial force for a segment in each ring and may be used to determine the tensile strength required in the envelope material at each ring of the model. The calculations in Row 18 account for the fact that the in surface inertial forces generated in the x number of segments in Ring y must be sustained by the smaller number of segments in Ring y-1.

It may be seen by comparing Row 18 with Row 16 that the cumulative in surface force of tension due to inertia greatly exceeds, by more than two orders of magnitude, the force due to atmospheric pressure as rings closer to the axis of rotation are examined. Therefore, without any adjustments of envelope material thickness, material strength or envelope internal reinforcements, the profile of the upper surface of the envelope would be very nearly flat and straight.

Preferably, in accordance with this model, the material of the envelope may not be uniform in thickness, mass and tensile strength per segment from its outer margin at ring 38 to its inner edge at Ring 1. Referring to FIG. 19, a thickening of the envelope material near the core tube at locations 17L and 18L is preferred to accommodate the accumulation of the in surface inertial forces in lower numbered rings.

As an example: the accumulation of the inertial forces of rotation at Ring 1 is quite large and if these forces were to be sustained by high tensile strength carbon fiber with a tensile strength rating in the range of 3.16 G Pa, then the carbon fiber would have to be about 1.0 centimeter thick at Ring 1 assuming a design safety factor of 100%.

In addition to increased tensile strength, these strengthened areas may also provide increased strength in the shear dimension to insure the convex shape of the envelope exterior surface while it is evacuated. Subject to design considerations and specific materials selected for each portion of the envelope, preferably internal mechanical reinforcement structures may be provided in the form of truncated cones such as those shown at 15L, 16L and 19L. The convex external envelope shape is easily maintained during periods when the envelope is inflated.

The outer edge of the envelope may also be thickened and hardened as indicated at 14L to provide additional strength to sustain external aerodynamic forces resulting from high speed lateral motion. Further, please note that the thickened areas 14L, 17L and 18L indicated in FIG. 19, are not shown to scale but are instead shown to be much thicker than they would actually be for the purposes of clarity of illustration for this model.

The present invention may be embodied in other specific forms without departing from the spirit or essential attributes thereof and, accordingly, reference should be made to the appended claims, rather than to the foregoing specification as indicating the scope of the invention.

I claim:

1. An aircraft wherein lift is provided by means of a buoyant, at least partially evacuated, rotating envelope, including a motor for causing said envelope to rotate, wherein the envelope's resistance to inward force of ambient atmospheric pressure is provided at least in part by centrifugal force acting outwardly on the envelope as a result of the envelope's rotation.

2. An aircraft in accordance with claim 1 wherein said motor for causing said envelope to rotate is attached to said rotating buoyant evacuated envelope and rotates with said envelope.

3. An aircraft in accordance with claim 2 wherein said motor for rotating said envelope provides sufficient force to rotate said envelope against the force of air friction acting on the external surface of said envelope.

4. An aircraft in accordance with claim 1 wherein shape, displacement and aspect ratio of said envelope is selectively changed dynamically during flight to optimize said envelope for varying flight requirements and conditions.

5. An aircraft in accordance with claim 1 including evacuating means and pressurizing means for evacuating and pressurizing said envelope.

6. An aircraft in accordance with claim 1 wherein the shape of said envelope is capable of being dynamically changed while the aircraft is in flight.

7. An aircraft in accordance with claim 1 wherein a lifting force is provided to the aircraft by means for evacuating said envelope to provide a lighter-than-air buoyant envelope.

8. An aircraft in accordance with claim 1 wherein a lifting force is provided by said envelope which is shaped in the form of an airfoil which is caused to move in lateral motion through the atmosphere producing lift.

9. An aircraft in accordance with claim 1 wherein said rotating envelope is in the form of a disk.

10. An aircraft in accordance with claim 1 wherein said rotating envelope is in the form of a disk mounted on a central core tube, said central core tube having an axis of rotation coincident with the axis of rotation of said disk, said central core tube being adapted to elongate to enable expansion of said disk in the direction of its axis.

11. An aircraft in accordance with claim 1 including at least one pump adapted and connected to evacuate air from said envelope or pump air into said envelope wherein the pressure inside said envelope is varied to accommodate differing flight conditions.

12. An aircraft wherein lift is provided by means of a buoyant, evacuated, rotating envelope, including an engine for rotating said envelope, and including means for dividing output air and exhaust of said engine into multiple flow streams for the purpose of creating a rotating torque force on the engine.

13. An aircraft in accordance with claim 12 wherein said means for dividing the output air and exhaust issuing from said engine into multiple flow streams includes deflection means mounted in the output air and exhaust of said engine.

14. An aircraft wherein lift is provided by means of a buoyant, evacuated, rotating envelope, including means for rotating said envelope to provide a centrifugal force on exterior material of said rotating envelope whereby the need for and weight of mechanical support structures to withstand the inward force of external atmospheric pressure is reduced.

15. An aircraft wherein lift is provided by means of a buoyant, evacuated, rotating envelope, including means for rotating said envelope about an axis normal to the direction of lateral motion of the aircraft during flight thereby exposing the leading edges and surfaces of said envelope to aerodynamic heating caused by contact with atmosphere during only a portion of each rotation of said envelope.

16. An aircraft wherein lift is provided by means of a buoyant, evacuated, rotating envelope, including an engine for rotating said envelope, said engine and envelope being connected together such that they corotate.

17. An aircraft wherein lift is provided by means of a buoyant, evacuated, rotating envelope, wherein lifting forces are provided by one or more engines which are structured and adapted to direct air thrust in a downward direction.

18. An aircraft wherein lift is provided by means of a buoyant, evacuated, rotating envelope, wherein lifting forces for the aircraft are provided by said envelope being caused to rotate such that reaction forces realized from air flow leaving the surface of said rotating envelope produce a momentum of downward air flow which is greater than the momentum of upward air flow.

19. An aircraft in accordance with any of claims 7, 8, 17 or 18 wherein the amount of lift produced is selectively varied dynamically during flight of the aircraft.

20. An aircraft wherein lift is provided by means of a buoyant, evacuated, rotating envelope, including a non-rotating payload compartment mounted by means of bearings to said rotating envelope.

21. An aircraft in accordance with claim 20 wherein said payload compartment is provided with means for counter-acting rotation of said payload compartment.

22. An aircraft in accordance with claim 20 wherein said non-rotating payload compartment is provided with jets for enhancing lateral movement of the aircraft during flight.

23. An aircraft wherein lift is provided by means of a buoyant, evacuated, rotating envelope;

said rotating envelope being in the form of a disk mounted on a central core tube, said central core tube having an axis of rotation coincident with the axis of rotation of said disk, said central core tube being adapted to elongate to enable expansion of said disk in the direction of its axis; and, a non-rotating payload compartment mounted to said central core tube and provided with means for reducing friction between said central core tube and said non-rotating payload compartment.

24. An aircraft wherein lift is provided by means of a buoyant, evacuated, rotating envelope;

said rotating envelope being in the form of a disk mounted on a central core tube, said central core tube having an axis of rotation coincident with the axis of rotation of said disk, said central core tube being adapted to elongate to enable expansion of said disk in the direction of its axis; and, a jet engine mounted within said central core tube, a divider plate mounted in an exhaust flow path of said jet engine and one or more exhaust deflector plates mounted in said exhaust flow path for causing said envelope and core tube to rotate.

25. An aircraft wherein lift is provided by means of a buoyant, rotating envelope;

means for at least partially evacuating said envelope;

a non rotating payload compartment; and, means for rotating said envelope to provide a centrifugal force on material comprising said envelope whereby the need for and weight of mechanical structures to withstand the inward force of external atmospheric pressure is reduced.

26. An aircraft in accordance with claim 25 wherein said means for rotating said envelope is attached to said rotating buoyant evacuated envelope and rotates with said envelope.

27. An aircraft in accordance with claim 26 wherein said means for rotating said envelope provides sufficient force to rotate said envelope against the force of air friction acting on the external surface of said envelope.

28. An aircraft in accordance with claim 25 wherein shape, displacement and aspect ratio of said envelope may be changed dynamically during flight to optimize said envelope for varying flight requirements and conditions.

29. An aircraft in accordance with claim 25 wherein said means for rotating said envelope includes an engine for rotating said envelope and means for dividing engine output air and exhaust of said engine into multiple flow streams for the purpose of creating a rotating torque force on the engine.

30. An aircraft in accordance with claim 29 wherein said means for dividing the output air and exhaust issuing from said engine into multiple flow streams includes deflection means mounted in the output air and exhaust of said engine.

31. An aircraft in accordance with claim 25 including pressurizing means for pressurizing said envelope.

32. An aircraft in accordance with claim 25 wherein said means for rotating said envelope rotates said envelope about an axis normal to the direction of lateral motion of the aircraft during flight thereby exposing the leading edges and surfaces of said envelope to aerodynamic heating caused by contact with atmosphere during only a portion of each rotation of said envelope.

33. An aircraft in accordance with claim 25 wherein said means for rotating said envelope includes an engine, and said engine for rotating said envelope and said envelope are connected together such that they corotate.

34. An aircraft in accordance with claim 25 wherein the shape of said envelope may be dynamically changed while the aircraft is in flight.

35. An aircraft in accordance with claim 25 wherein a lifting force is provided by said envelope which is caused to move in lateral motion through the atmosphere producing lift.

36. An aircraft in accordance with claim 25 wherein lifting forces are provided by one or more engines which are structured and adapted to direct air thrust in a downward direction.

37. An aircraft in accordance with claim 25 wherein lifting forces for the aircraft are provided by said envelope being caused to rotate such that reaction forces realized from air flow leaving the surface of said rotating envelope produce a momentum of downward air flow which is greater than the momentum of upward air flow.

38. An aircraft in accordance with any of the claims 35 through 37 wherein the amount of lift produced is selectively varied dynamically during flight of the aircraft.

39. An aircraft in accordance with claim 25 wherein said non-rotating payload compartment is mounted by means of bearings to said rotating envelope.

40. An aircraft in accordance with claim 39 wherein said payload compartment is provided with means for counteracting rotation of said payload compartment.

41. An aircraft in accordance with claim 39 wherein said non-rotating payload compartment is provided with jets for enhancing lateral movement of the aircraft during flight.

42. An aircraft in accordance with claim 25 wherein said rotating envelope is in the form of a disk.

43. An aircraft in accordance with claim 25 wherein said rotating envelope is in the form of a disk mounted on a central core tube, said central core tube having an axis of rotation coincident with the axis of rotation of said disk, said central core tube being adapted to elongate to enable expansion of said disk in the direction of its axis.

44. An aircraft in accordance with claim 43 including said non-rotating payload compartment mounted to said central core tube and provided with means for reducing friction between said central core tube and said non-rotating payload compartment.

45. An aircraft in accordance with claim 43 wherein said means for rotating said envelope is a jet engine mounted within said central core tube, and a divider plate mounted in an exhaust flow path of said jet engine and one or more exhaust deflector plates mounted in said exhaust flow path for causing said envelope and core tube to rotate.

46. A process for reducing the amount of leading edge heating caused by an aircraft as claimed in claim 1 traveling through ambient atmosphere at a speed sufficient to generate significant leading edge heating, comprising the steps of:

providing said rotating envelope in the form of a rotatable disk shaped airfoil;

causing said rotatable disk shaped airfoil to travel laterally through the atmosphere wherein leading edge heating occurs on the periphery of the rotatable disk shaped airfoil only during a portion of each rotation of said airfoil where said portion is in the direction of flight; and, providing a cooling period for said portion of said airfoil previously subjected to heating for the remainder of each rotation.

* * * * *